US008928944B2

(12) United States Patent  
Carlen et al.

(10) Patent No.: US 8,928,944 B2  
(45) Date of Patent: Jan. 6, 2015

(54) DOCUMENT ASSEMBLY AND AUTOMATED CONTEXTUAL FORM GENERATION

(71) Applicant: Apple Inc., Cupertino, CA (US)

(72) Inventors: Conrad Rhodes Carlen, Burlingame, CA (US); Nils Theodore Beck, San Mateo, CA (US); Matthew Jacob Sarnoff, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 13/628,106

(22) Filed: Sep. 27, 2012

(65) Prior Publication Data

US 2013/0201534 A1 Aug. 8, 2013

Related U.S. Application Data

(60) Provisional application No. 61/594,992, filed on Feb. 3, 2012.

(51) Int. Cl.  
*H04N 1/405* (2006.01)

(52) U.S. Cl.  
USPC .......................................... 358/2.1; 358/450

(58) Field of Classification Search  
CPC .......... G06F 17/30991; G06F 3/04817; G06F 3/048; G06F 3/0486; G06F 2217/17; G06F 3/1205; G06F 3/1253; H04N 1/387; H04N 1/00411; H04N 1/00474; H04N 1/00482; H04N 1/00424; H04N 1/00458; H04N 1/00461

USPC ................. 358/1.9, 2.1, 450, 1.15–1.16, 1.1; 715/838, 255, 770

See application file for complete search history.

(56) References Cited

U.S. PATENT DOCUMENTS

| 7,617,450 | B2 * | 11/2009 | Jones et al. .................... 715/255 |
| 7,853,888 | B1 * | 12/2010 | Dhawan et al. ................ 715/770 |
| 2012/0075670 | A1 * | 3/2012 | Yamaguchi ................... 358/1.15 |
| 2012/0194861 | A1 * | 8/2012 | Miyaguchi .................... 358/1.15 |
| 2013/0275422 | A1 * | 10/2013 | Silber et al. ................... 707/728 |

* cited by examiner

*Primary Examiner* — Thomas D Lee  
*Assistant Examiner* — Stephen M Brinich  
(74) *Attorney, Agent, or Firm* — Fish & Richardson P.C.

(57) ABSTRACT

This disclosure describes systems, methods, and computer program products for displaying one or more pages of a first document in a first region on a user interface; displaying thumbnail images of the one or more pages of the first document in a second region on the user interface; receiving user input for inserting one or more pages from a non-digitized second document into the first document; and in response to the user input, digitizing the one or more pages of the non-digitized second document using a document scanning device, and inserting the one or more pages of the digitized second document into the first document, wherein the inserted pages are displayed as part of the first document on the user interface.

32 Claims, 28 Drawing Sheets

| | RENTAL_APP COPY (1 PAGE) | |
|---|---|---|
| VIEW ZOOM SHARE | | MARKUP EDIT SEARCH |

RENTAL APPLICATION: TO PROCESS RETURN W/COPIES OF RECENT PAY STUB AND DRIVER'S LICENSE OR STATE I.D. ALL ITEMS MUST BE FILLED IN FOR APPLICATION TO BE CONSIDERED

804 REQUESTED UNIT I ⟵806  DATE OF MOVE IN_____ DEPOSIT MADE $_____  — 802
FULL NAME_____ HOME PHONE_____ WORK PHONE_____
SOCIAL #_____ DATE OF BIRTH_____ CELL PHONE_____
DRIVERS LICENSE #_____ DATE ISSUED_____ EXP. DATE_____
ADDRESS OF DRIVER'S LICENSE/STATE ID_____
FULL CURRENT ADDRESS_____
HOW LONG_____ MO. RENT $_____ REASON MOVING_____
LANDLORD_____ LANDLORD PHONE #_____
LEASE EXPIRATION_____ IS RENT CURRENT?_____ NUMBER LATE PAYMENTS?_____
PREVIOUS ADDRESS_____
HOW LONG_____ MO. RENT $_____ REASON MOVED_____
LANDLORD NAME_____ LANDLORD PHONE #_____
NAME/AGE/RELATIONSHIP OF EACH PERSON TO RESIDE WITH YOU_____

EMPLOYER_____ ADDRESS_____
HOW LONG_____ POSITION_____ HOURS PER WEEK_____ RATE OF PAY_____
SUPERVISOR NAME_____ SUPERVISOR PHONE #_____
CHILD SUPPORT, SOCIAL SECURITY, AFDC, OR OTHER INCOME_____
DO YOU HAVE SECTION 8 CERTIFICATE OR VOUCHER?_____ #B/R_____ WHAT HOUSING AUTHORITY_____
SAVINGS BANK_____ ACCT#_____ PHONE #_____
CHECKING BANK_____ ACCT#_____ PHONE #_____

TOTAL # OF VEHICLES_____ VEHICLE YR/MAKE/MODEL_____ TAG_____ STATE_____
VEHICLE YR/MAKE/MODEL_____ TAG_____ STATE_____
ADDRESS ON REGISTRATION_____
HAVE YOU EVER FILED BANKRUPTCY?_____ BEEN EVICTED?_____
ANY LANDLORD OR OTHER JUDGMENTS AGAINST YOU?_____ EXPLAIN_____
HAVE YOU BEEN SERVED WITH AN EVICTION NOTICE OR BEEN ASKED TO VACATE A PROPERTY YOU WERE RENTING?
NO_____ YES/EXPLAIN_____
WILLFULLY OR INTENTIONALLY REFUSED TO PAY RENT WHEN DUE
NO_____ YES/EXPLAIN_____
LIST TWO PERSONAL REFERENCES NAME AND PHONE #_____
LIST ANY ESTABLISHED CREDIT (GOOD OR BAD) ON THE BACK OF THIS FORM.
PETS ARE NOT PERMITTED!!!!!!
THERE IS NO FEE FOR THIS APPLICATION; HOWEVER, ONCE APPLICANT HAS CHOSEN A UNIT, AN EARNEST MONEY DEPOSIT OF½ THE SECURITY DEPOSIT IS REQUIRED TO HOLD THE UNIT. SAID DEPOSIT WILL BE REFUNDED IF APPLICATION IS NOT ACCEPTED. UPON ACCEPTANCE OF THIS APPLICATION, THE DEPOSIT WILL BE RETAINED AS A SECURITY DEPOSIT TO HOLD SAID UNIT UNTIL THE AGREED UPON MOVE IN DATE. A WRITTEN LEASE FOR THE UNIT, BALANCE OF THE SECURITY DEPOSIT AND FIRST MONTHS RENT ARE DUE PRIOR

RENTAL_APP COPY (1 PAGE)

VIEW  ZOOM  SHARE                    MARKUP  EDIT   SEARCH

RENTAL APPLICATION: TO PROCESS RETURN W/COPIES OF RECENT PAY STUB AND DRIVER'S LICENSE OR STATE I.D.
ALL ITEMS MUST BE FILLED IN FOR APPLICATION TO BE CONSIDERED.

REQUESTED UNIT_____ DATE OF MOVE IN_____ DEPOSIT MADE $_____
904  FULL NAME_____906_____ HOME PHONE_____ WORK PHONE_____
SOCIAL #_____ DATE OF BIRTH_____ CELL PHONE_____
DRIVERS LICENSE #_____ DATE ISSUED_____ EXP. DATE_____
ADDRESS OF DRIVER'S LICENSE/STATE ID_____
FULL CURRENT ADDRESS_____
HOW LONG_____ MO. RENT $_____ REASON MOVING_____
LANDLORD_____ LANDLORD PHONE #_____
LEASE EXPIRATION_____ IS RENT CURRENT?_____ NUMBER LATE PAYMENTS?_____
PREVIOUS ADDRESS_____
HOW LONG_____ MO. RENT $_____ REASON MOVED_____
LANDLORD NAME_____ LANDLORD PHONE #_____
NAME/AGE/RELATIONSHIP OF EACH PERSON TO RESIDE WITH YOU_____

EMPLOYER_____ ADDRESS_____
HOW LONG_____ POSITION_____ HOURS PER WEEK_____ RATE OF PAY_____
SUPERVISOR NAME_____ SUPERVISOR PHONE #_____
CHILD SUPPORT, SOCIAL SECURITY, AFDC, OR OTHER INCOME_____
DO YOU HAVE SECTION 8 CERTIFICATE OR VOUCHER?_____ #B/R_____ WHAT HOUSING AUTHORITY_____
SAVINGS BANK_____ ACCT#_____ PHONE #_____
CHECKING BANK_____ ACCT#_____ PHONE #_____

TOTAL # OF VEHICLES_____ VEHICLE YR/MAKE/MODEL_____ TAG_____ STATE_____
VEHICLE YR/MAKE/MODEL_____ TAG_____ STATE_____
ADDRESS ON REGISTRATION_____
HAVE YOU EVER FILED BANKRUPTCY?_____ BEEN EVICTED?_____
ANY LANDLORD OR OTHER JUGMENTS AGAINST YOU?_____ EXPLAIN_____
HAVE YOU BEEN SERVED WITH AN EVICTION NOTICE OR BEEN ASKED TO VACATE A PROPERTY YOU WERE RENTING?
NO_____ YES/EXPLAIN_____
WILLFULLY OR INTENTIONALLY REFUSED TO PAY RENT WHEN DUE
NO_____ YES/EXPLAIN_____
LIST TWO PERSONAL REFERENCES NAME AND PHONE #_____
LIST ANY ESTABLISHED CREDIT (GOOD OR BAD) ON THE BACK OF THIS FORM.
PETS ARE NOT PERMITTED!!!!!
THERE IS NO FEE FOR THIS APPLICATION; HOWEVER, ONCE APPLICANT HAS CHOSEN A UNIT, AN EARNEST MONEY DEPOSIT OR THE SECURITY DEPOSIT IS REQUIRED TO HOLD THE UNIT. SAID DEPOSIT WILL BE REFUNDED IF APPLICATION IS NOT ACCEPTED. UPON ACCEPTANCE OF THIS APPLICATION, THE DEPOSIT WILL BE RETAINED AS A SECURITY DEPOSIT TO HOLD SAID UNIT UNTIL THE AGREED UPON MOVE IN DATE. A WRITTEN LEASE FOR THE UNIT, BALANCE OF THE SECURITY DEPOSIT AND FIRST MONTHS RENT ARE DUE PRIOR

- UPWARD WHITE PIXEL COUNT = 2
- DOWNWARD WHITE PIXEL COUNT = 5
- LEFTWARD WHITE PIXEL COUNT = 4
- RIGHTWARD WHITE PIXEL COUNT = 3

DOCUMENT ASSEMBLY AND AUTOMATED CONTEXTUAL FORM GENERATION

CROSS-REFERENCE TO RELATED APPLICATIONS

This application claims priority to U.S. Provisional Application Ser. No. 61/594,992, entitled "DOCUMENT ASSEMBLY AND AUTOMATED CONTEXTUAL FORM GENERATION", filed on Feb. 3, 2012, the entire contents of which are incorporated herein by reference.

TECHNICAL FIELD

This disclosure is generally related to a user interface for assembling documents and generating automated contextual forms.

BACKGROUND

Digital media can be imported from external devices (e.g., cameras) onto personal computers for storage. Users can view the imported digital media on the personal computer once the digital media has been imported.

SUMMARY

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

This disclosure describes systems, methods, and computer program products for assembling documents on a computing device. A first document, e.g., a document in a portable document format, can be presented in a graphical user interface (GUI). Thumbnail images of one or more pages in the first document can also be presented on the GUI. A user can select an option for inserting one or more pages from a second document into the first document. The user can also indicate a position in the first document where the one or more pages of the second document will be inserted. The one or more pages of the second document can be in a file format, e.g., a portable document format, in an un-digitized format, or can be a blank page. Document pages in an un-digitized format can be digitized using a document scanning device using document settings derived from the first document, and can be inserted into the first document. In some implementations, a scan resolution, a scan area size, a color depth, and a desired post-processing can be derived from a document. The modified first document can be presented on the GUI, where the user can continue inserting pages from the second document into the first document.

In some implementations, a method comprises: displaying one or more pages of a first document in a first region on a user interface; displaying thumbnail images of the one or more pages of the first document in a second region on the user interface; receiving user selection for inserting one or more pages from a non-digitized second document into the first document; and in response to the user selection, digitizing the one or more pages of the non-digitized second document using a document scanning device, and inserting the one or more pages of the digitized second document into the first document, wherein the inserted pages are displayed as part of the first document on the user interface.

In some implementations, a system comprises one or more processors and memory coupled to the one or more processors. The memory is configured for storing instructions, which, when executed by the one or more processors, causes the one or more processors to perform operations. The operations comprise displaying one or more pages of a first document in a first region on a user interface; displaying thumbnail images of the one or more pages of the first document in a second region on the user interface; receiving user selection for inserting one or more pages from a non-digitized second document into the first document; and in response to the user selection, digitizing the one or more pages of the non-digitized second document using a document scanning device, and inserting the one or more pages of the digitized second document into the first document, wherein the inserted pages are displayed as part of the first document on the user interface.

Other implementations are disclosed that are directed to methods, systems and computer-readable mediums.

This disclosure also describes systems, methods, and computer program products for automated contextual form generation on a computing device. A first document, e.g., a document in a portable document format that includes one or more non-digitized form fields can be presented in a GUI. A user can select a position in the first document. In response to the selection, a non-digitized field located in proximity to the selected position can be identified. If a non-digitized field is identified, the non-digitized field is digitized, where digitization of the non-digitized field allows the ability to electronically edit the non-digitized field.

In some implementations, a method comprises: displaying a first document on a user interface, the first document containing one or more non-digitized fields; receiving a user selection of a position in the first document; in response to the user selection, identifying a non-digitized field located in proximity to the selected position; and if a non-digitized field is identified as being located in proximity to the selected position, digitizing the non-digitized field.

In some implementations, a system comprises one or more processors and memory coupled to the one or more processors. The memory is configured for storing instructions, which, when executed by the one or more processors, causes the one or more processors to perform operations. The operations comprise displaying a first document on a user interface, the first document containing one or more non-digitized fields; receiving a user selection of a position in the first document; in response to the user selection, identifying a non-digitized field located in proximity to the selected position; and if a non-digitized field is identified as being located in proximity to the selected position, digitizing the non-digitized field.

Other implementations are disclosed that are directed to methods, systems and computer-readable mediums.

Particular implementations of the document assembly and automated contextual form generation application disclosed herein provide one or more of the following advantages. Users can insert non-digitized documents directly into a document being viewed in a GUI. Users can indicate, using the GUI, a position in the document where pages from the non-digitized document should be inserted. Non-digitized form fields and check boxes in an electronic document can be digitized based on user selections of the non-digitized form fields and check boxes.

The details of the disclosed implementations are set forth in the accompanying drawings and the description below. Other features, objects, and advantages will be apparent from the description and drawings, and from the claims.

DESCRIPTION OF DRAWINGS

FIG. 7 illustrates an exemplary GUI depicting pages of a combined first document.

FIG. 8 illustrates an exemplary GUI depicting a document with non-digitized form fields.

FIG. 9 illustrates an exemplary GUI depicting a document with an electronically editable form field.

FIG. 10 illustrates an exemplary GUI depicting a document with information entered in an electronically editable form field.

The same reference symbol used in various drawings indicates like elements.

DETAILED DESCRIPTION

The disclosure that follows describes a document assembly and automated contextual form generation application. A user can select an option for inserting one or more pages from a second document into the first document. The user can also indicate a position in the first document where the one or more pages of the second document will be inserted. The one or more pages of the second document can be in a file format, e.g., in an image or a portable document format, in an un-digitized format, or can be a blank page. The blank page need not exist in a particular file format or an un-digitized format and can be generated by the computing device. Document pages in an un-digitized format can be digitized using a document scanning device, where the document pages are formatted using document settings derived from the first document, and can be inserted into the first document. The modified first document can be presented on the GUI and the user can continue inserting pages from the second document into the first document.

The application can also automatically generate contextual forms in a first document, e.g., a document in a portable document format that includes one or more non-digitized form fields. A user can select a position in the first document. In response to the selection, a non-digitized field located in proximity to the selected position can be identified. If a non-digitized field is identified, the non-digitized field is digitized, where digitization of the non-digitized field allows the ability to electronically edit the non-digitized field.

Exemplary GUI for Document Assembly

Figure 1:
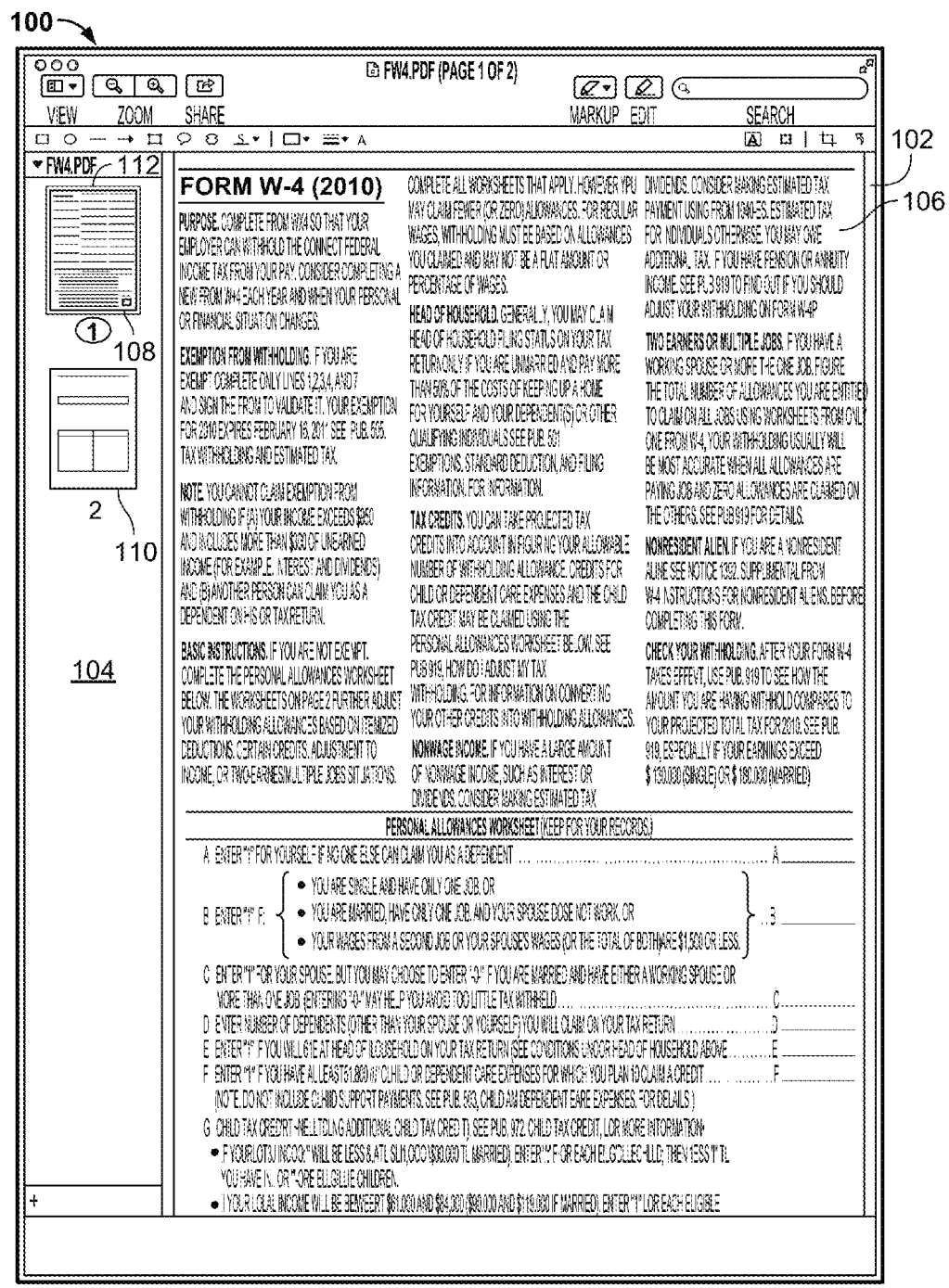
FIG. 1 illustrates an exemplary GUI depicting a first document.

FIG. 1 illustrates an exemplary GUI 100 depicting a first document 106. The GUI 100 includes a first region 102 for displaying one or more pages of the first document 106 and a second region 104 for displaying thumbnail images of the one or more pages of the first document 106. The first document being displayed on the GUI 100 can be a file that is stored on a computing device on which the GUI 100 is executing.

In FIG. 1, a page of the first document 106 is displayed in the first region 102 of the GUI 100. In addition, thumbnail images 108 and 110 that correspond to pages in the first document 106 are displayed in the second region 104. A user can select one of the thumbnail images 108 and 110 to display a page corresponding to the thumbnail image in the first region 106. In particular, thumbnail image 108 is shown with a border 112 indicating that the page corresponding to the thumbnail image 108 is currently being displayed in the first region 106.

The computing device can be, for example, a personal computer, laptop, tablet, a handheld computer, a personal digital assistant, a cellular telephone, a smart phone, a media player, an email device, a game console, or other electronic device, or a combination of any two or more of these data processing devices or other data processing devices. The first document can be stored, for example, on other computing devices, external devices (e.g., cameras, portable hard drives, flash drives, network-attached storage devices), or cloud-based storage systems.

The accompanying drawings show a mouse cursor but other pointers, including human fingers, can be used with devices having touch sensitive surfaces.

Figure 2:
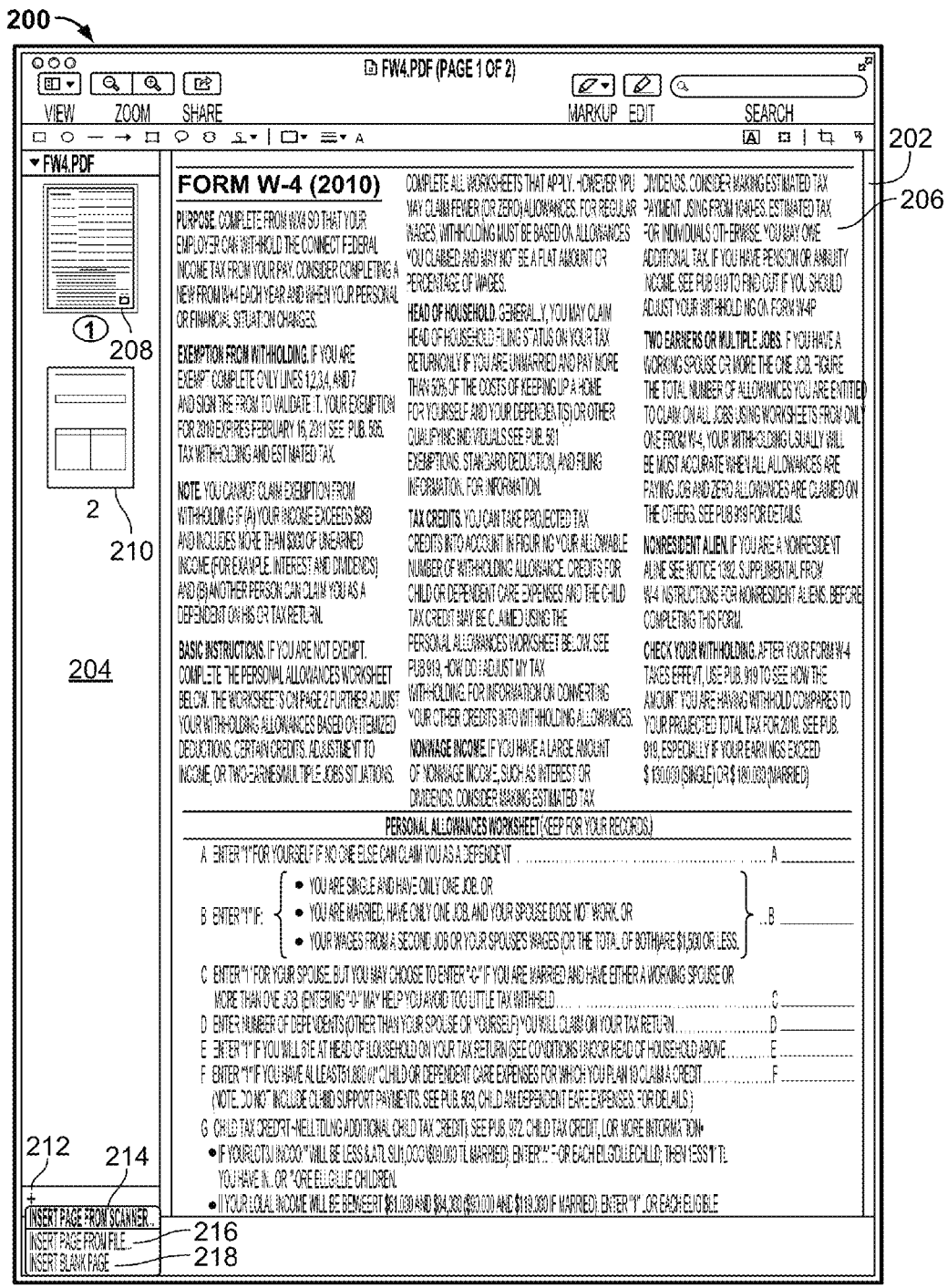
FIG. 2 illustrates an exemplary GUI depicting a first document and options for inserting a second document.

FIG. 2 illustrates an exemplary GUI 200 depicting a first document 206 and options 212 for inserting a second document. The GUI 200 includes a first region 202 for displaying one or more pages of the first document 206 and a second region 204 for displaying thumbnail images of the one or more pages of the first document 206. The GUI 200 also includes options 212 for inserting a second document into the first document. The second document can be a file that is stored on a computing device on which the GUI 200 is executing. Further, the second document can be stored, for example, on other computing devices, external devices (e.g., cameras, portable hard drives, flash drives, network-attached storage devices), or cloud-based storage systems.

In FIG. 2, a page of the first document 206 is displayed in the first region 202 of the GUI 200. In addition, thumbnail images 208 and 210 that correspond to pages in the first document 206 are displayed in the second region 204. The options 212 can be used to insert one or more pages of a second document into the first document. An option 214 can be selected to insert pages from a non-digitized second document, e.g., a document that is available as a hard copy, into the first document using a document scanning device, e.g., a scanner. A user can also select an option 216 to insert pages from a second document that is stored as a file. Additionally, an option 218 can be selected to insert one or more blank pages into the first document 206.

In some implementations, the option 214 can be selected to insert pages from a non-digitized document and, in response to the selection, a new document is created in which the pages from the non-digitized document will be added. Document settings for the new document, e.g., page formatting and size, can be determined based on the pages of the non-digitized document, e.g., the first inserted page, as they are scanned by a document scanning device.

In some implementations, a document scanning device used to insert pages from a non-digitized second document includes a document feeder. In some implementations, multiple pages of a non-digitized second document can automatically be inserted from a document scanning device. In some implementations, after each page is scanned, the scanned page is inserted into the first document and the page insertion position is incremented into a subsequent position.

Figure 3:
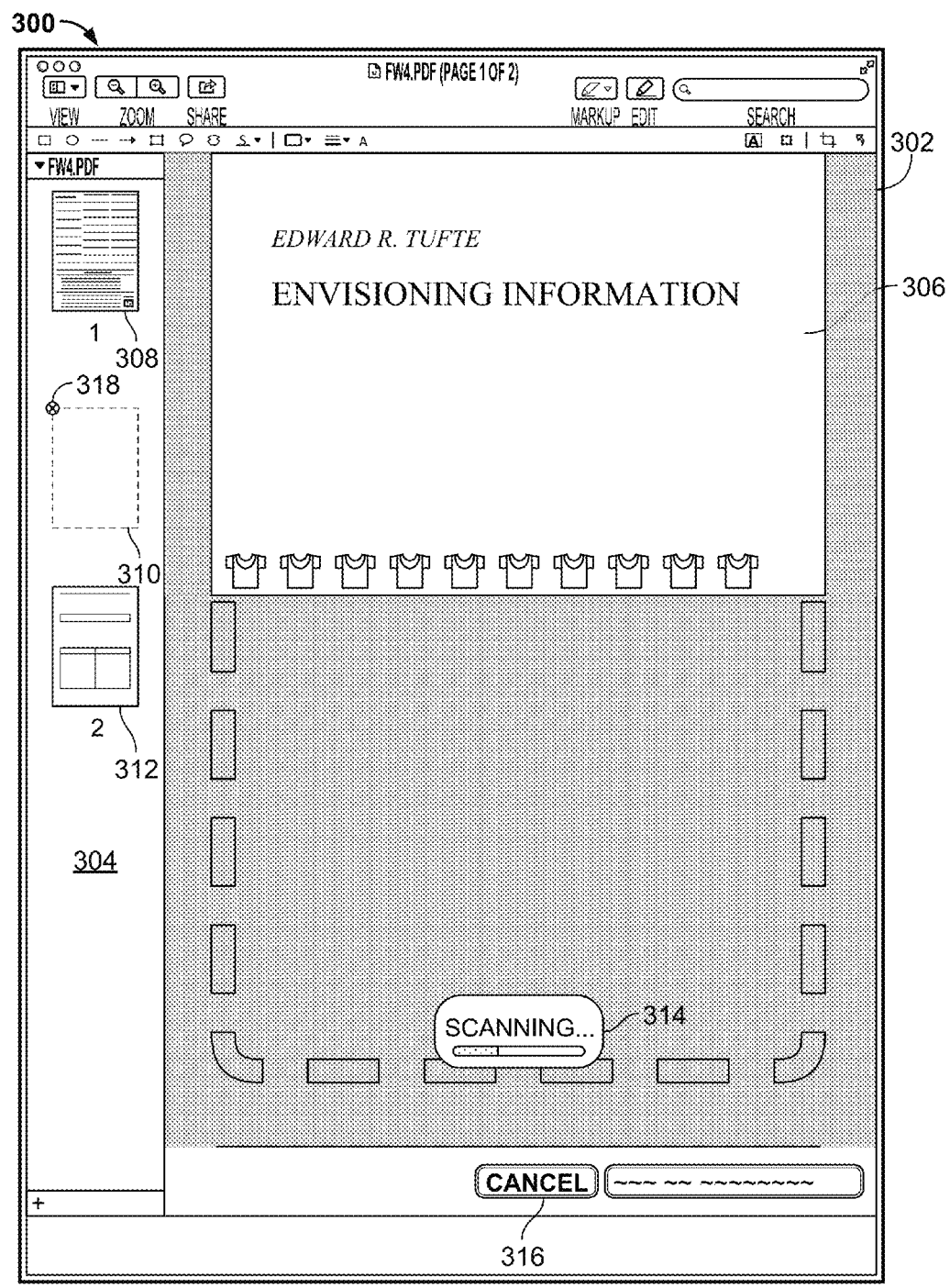
FIG. 3 illustrates an exemplary GUI depicting digitization of a second document.

FIG. 3 illustrates an exemplary GUI 300 depicting digitization of a second document 306. The GUI 300 includes a first region 302 for displaying digitized pages of the second document 306 and a second region 304 for displaying thumbnail images 308 and 312 of the pages of a first document and inserted digitized pages of the second document 306.

In FIG. 3, a page from the second document 306 is depicted as being digitized using a document scanning device. The document scanning device can be a device that optically scans items in physical form, e.g., printed images, printed text, printed handwriting, or objects, and converts the items to a digital image. The GUI 300 can display portions of the page being digitized during the digitization process. The GUI 300 can display a message 314 indicating that digitization of a page from the second document 306 is in progress.

The second region 304 also depicts a placeholder 310 indicating a position in the first document in which the digitized page of the second document 306 will be inserted. In some implementations, the placeholder 310 can be specified by the user. The user can drag-and-drop the placeholder 310 in the second region 304 to specify an insertion position among the thumbnail images 308 and 312 corresponding to pages in the first document. The user can cancel the digitization process by selecting a cancel button 316. The cancel button 316 can cancel the currently ongoing scanning process. A user can select the cancel button 316, for example, to abort a scanning process to adjust the position of the second document in the document scanning device. The button 318 can be selected to exit the inline scan mode in the GUI 300. The GUI 300 can remain in scan mode until the button 318 is selected, thereby allowing a user to continue inserting pages into the first document. Once the button 318 is selected, the GUI 300 switches to a normal mode, as described in reference to FIG. 7 with respect to GUI 700. As a result of the cancellation, the digitization process can terminate and the first document can remain in an unaltered state.

Figure 4:
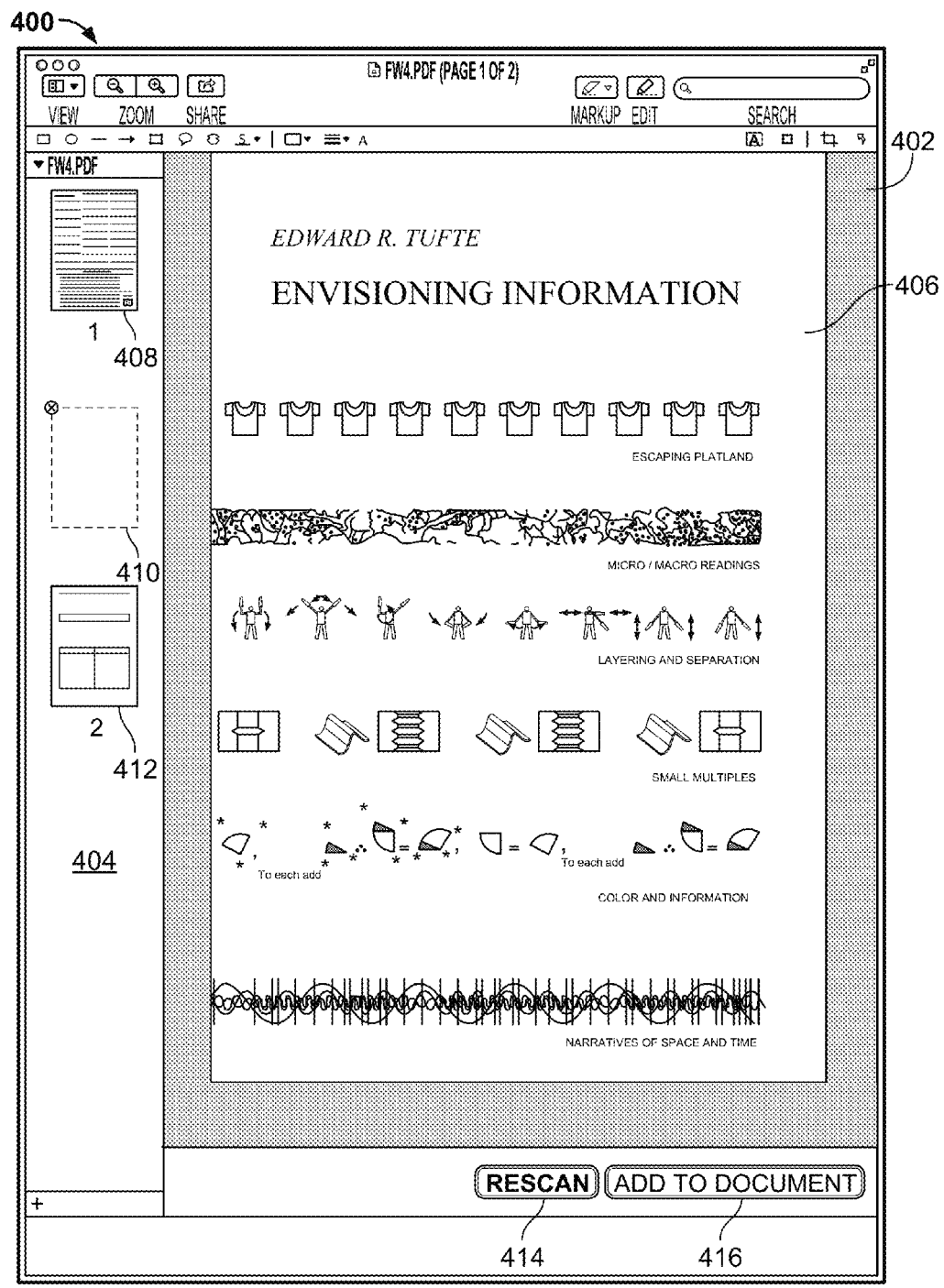
FIG. 4 illustrates an exemplary GUI depicting a digitized second document and options for the digitized second document.

FIG. 4 illustrates an exemplary GUI 400 depicting a digitized second document 406 and options 414 and 416 for the digitized second document. The GUI 400 includes a first region 402 for displaying digitized pages of the second document 406. The GUI 400 also includes a second region 404 for displaying thumbnail images 408 and 412 corresponding to pages in the first document and inserted digitized pages of the second document 406.

In FIG. 4, a page from the second document 406 is depicted as having been digitized using a document scanning device. The second region 404 depicts a placeholder 410 indicating a position in the first document in which the digitized page of the second document 406 will be inserted.

The GUI 400 depicts an option 414 for initiating a re-digitization of the digitized page of the second document 406. In some situations, the digitized page of the second document 406 may appear misaligned or unclear as a result of the digitization process. In such situations, the user can make adjustments to the second document 406 in the document scanning device and can then select the option 414 to re-scan a page from the second document 406.

In some implementations, the GUI 400 includes an option 416 for confirming the insertion of the digitized page of the second document 406. For example, upon digitization of a page, the user can view the digitized page in the first region 402 before the page is inserted into the first document, and can select the option 416 to confirm the insertion. In some other implementations, the digitized page is inserted into the first document automatically without a need for confirmation by the user.

Figure 5:
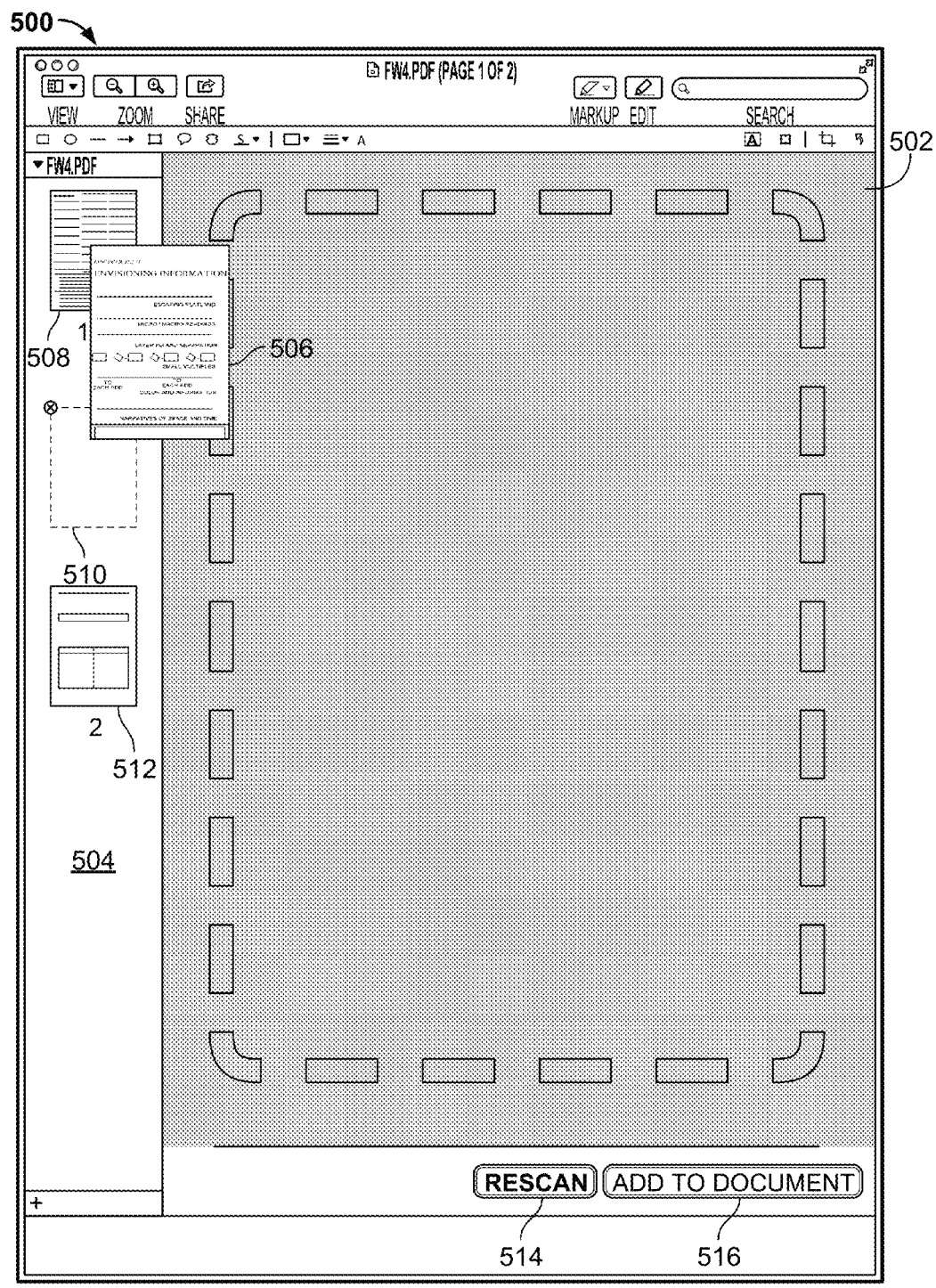
FIG. 5 illustrates an exemplary GUI depicting insertion of a digitized second document into a first document.

FIG. 5 illustrates an exemplary GUI 500 depicting insertion of a digitized second document 506 into a first document. The GUI 500 includes a first region 502 for displaying digitized pages of the second document 506. The GUI 500 also includes a second region 504 for displaying thumbnail images 508 and 512 corresponding to pages in the first document and a placeholder 510 where the digitized page of the second document 506 will be inserted. In FIG. 5, a page from the second document 506 is depicted as having been digitized and as being inserted into the first document. The second region 504 depicts a placeholder 510 indicating a position in the first document in which the digitized page of the second document 506 will be inserted.

Figure 6:
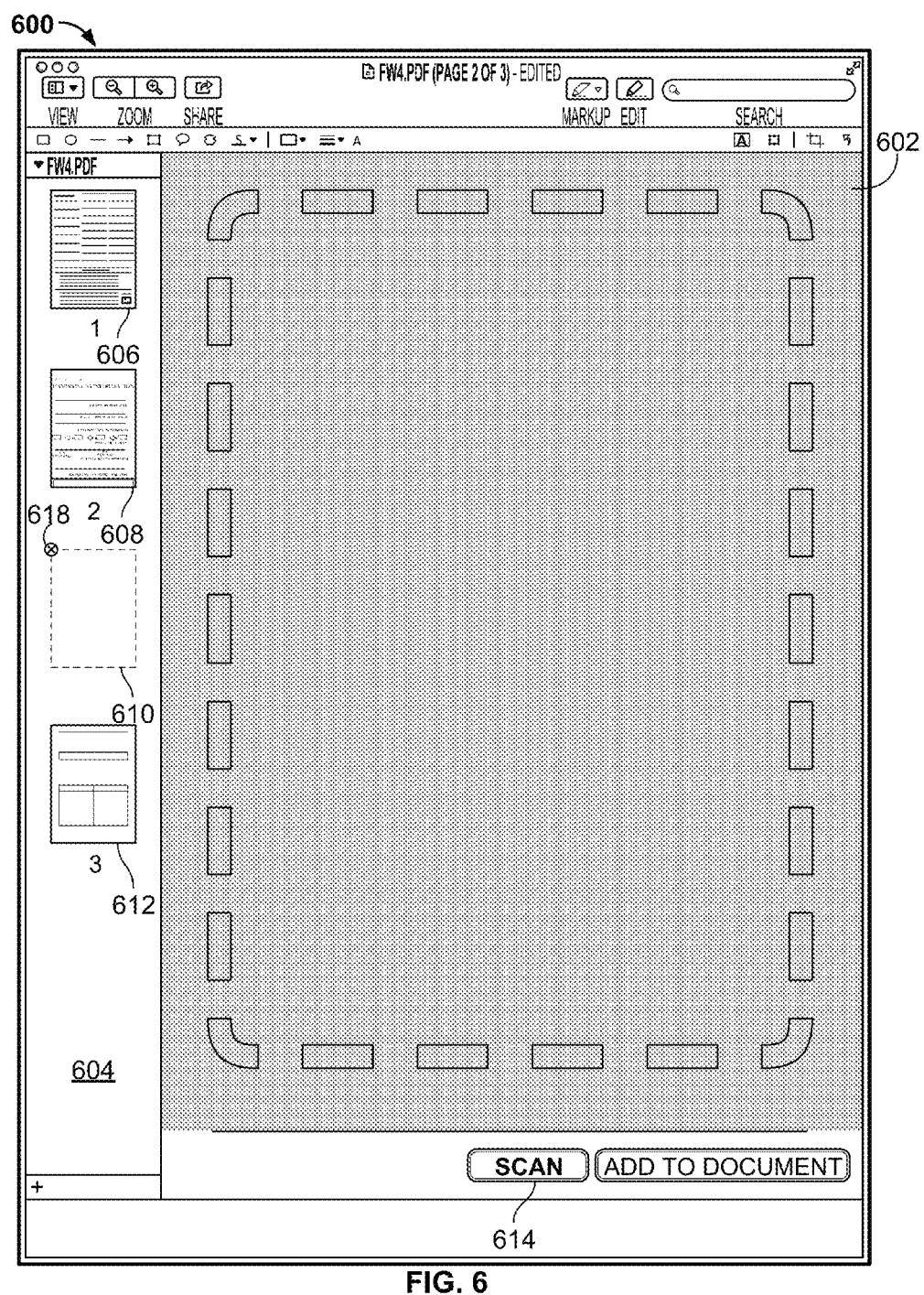
FIG. 6 illustrates an exemplary GUI depicting an option for digitizing and inserting another page into a first document.

FIG. 6 illustrates an exemplary GUI 600 depicting an option 614 for digitizing and inserting another page into the first document. The GUI 600 includes a first region 602 for previewing digitized pages. The GUI 600 also includes a second region 604 for displaying thumbnail images 606, 608, and 612 that correspond to pages in the first document. The second region 604 also depicts a placeholder 610 indicating a position in the first document in which a digitized page will be inserted. The GUI 600 also depicts an option 614 for initiating digitization of a page.

The GUI 600 can be presented upon insertion of a digitized second document, as described in reference to FIG. 5. The GUI 600 is shown as being in a scan mode. A user can use the GUI 600 to continue inserting non-digitized pages from a second document, e.g., by selecting the option 614 for initiating digitization of a page. A user can exit the scan mode by selecting an option 618. Once the option 318 is selected, the GUI 600 switches to a normal mode as described in reference to FIG. 7 with respect to GUI 700.

Figure 7:
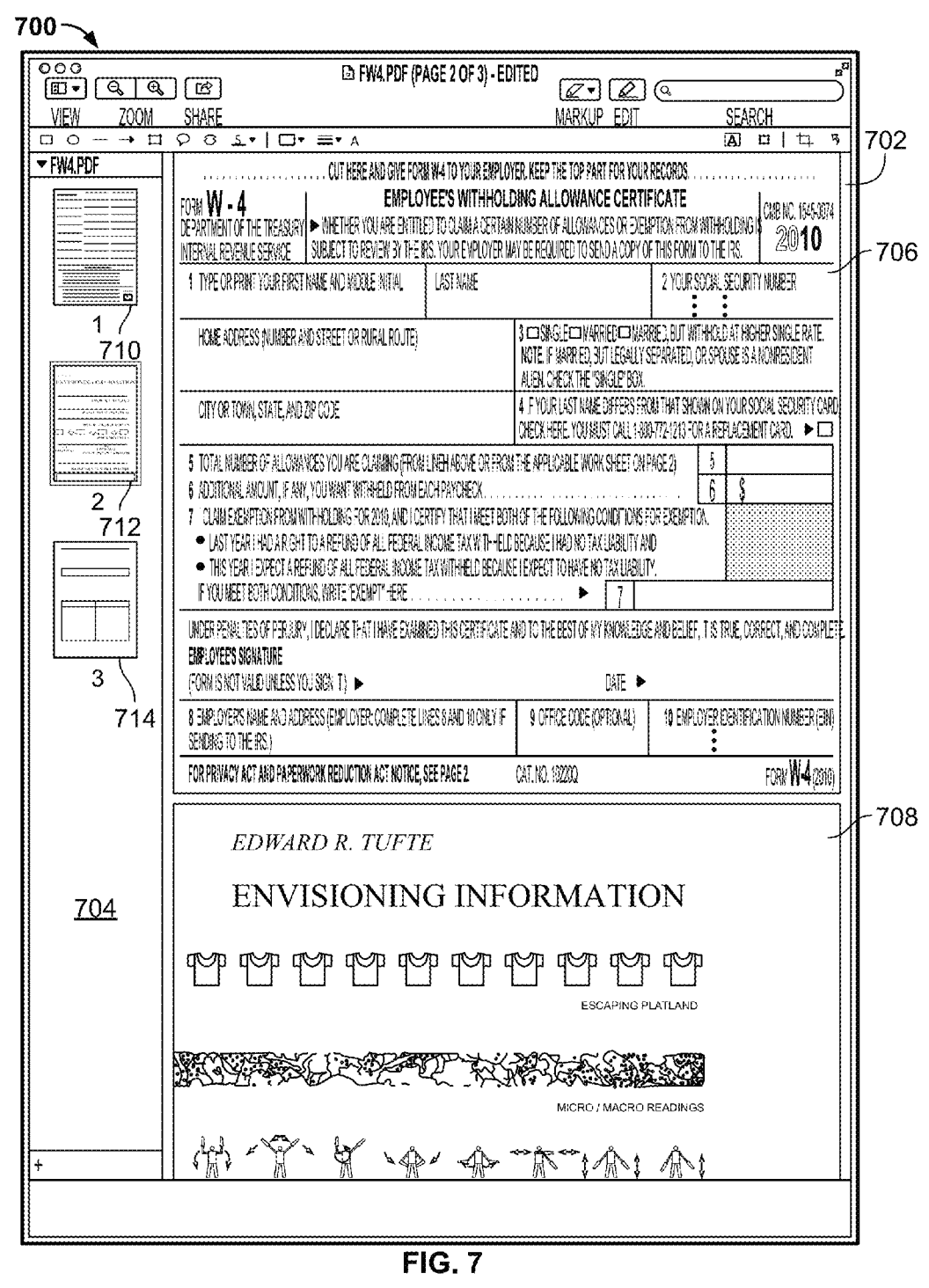

FIG. 7 illustrates an exemplary GUI 700 depicting pages 706 and 708 of a first document. The GUI 700 includes a first region 702 for displaying pages of the first document. The GUI 700 also includes a second region 704 for displaying thumbnail images 710, 712, and 714 that correspond to pages in the first document. A user can select a thumbnail image from the second region 704 to display a corresponding page in the first document. In particular, the first document is shown in the first region 702 as having inserted a page 708 that was digitized from a second document using a document scanning device, as described in reference to FIG. 5. A thumbnail image 712 that corresponds to the inserted page 708 is shown in the second region 604, indicating that the page 708 was inserted in the first document.

Exemplary GUI for Automated Contextual Form Generation

FIG. 8 illustrates an exemplary GUI 800 depicting a document 802 with non-digitized form fields. The document 802 includes several non-digitized form fields. For example, a non-digitized form field 804 is shown with the label "Requested Unit," along with a corresponding non-digitized line where information can be handwritten when the document is in a hard copy format.

In FIG. 8, a mouse cursor 806 is depicted as having been positioned near the non-digitized form field 804. In some implementations, a user can select a position near a non-digitized form field in the document, e.g., by performing a mouse click and, in response to the user selection, a non-digitized field located in proximity to the selected position can be identified. If a non-digitized field is identified as being located in proximity to the selected position, the non-digitized field is digitized. In some implementations, digitization of the non-digitized form field 804 results in creation of an electronically editable form field, e.g., a corresponding text box that is located in proximity to the non-digitized form field 804. The text box can be used to digitally enter information in the form field 804 using a computing device. In some implementations, non-digitized form fields are digitized on-the-fly by continuously analyzing a mouse cursor position and determining whether a non-digitized field is located in proximity to the mouse cursor position.

FIG. 9 illustrates an exemplary GUI 900 depicting a document 902 with an electronically editable form field 904. As described in reference to FIG. 8, the electronically editable form field 904 has been digitized into an electronically editable form field in response to a user selection. A user can enter information into the electronically editable form field 904 by, for example, typing content into the electronically editable form field 904.

Figure 10:
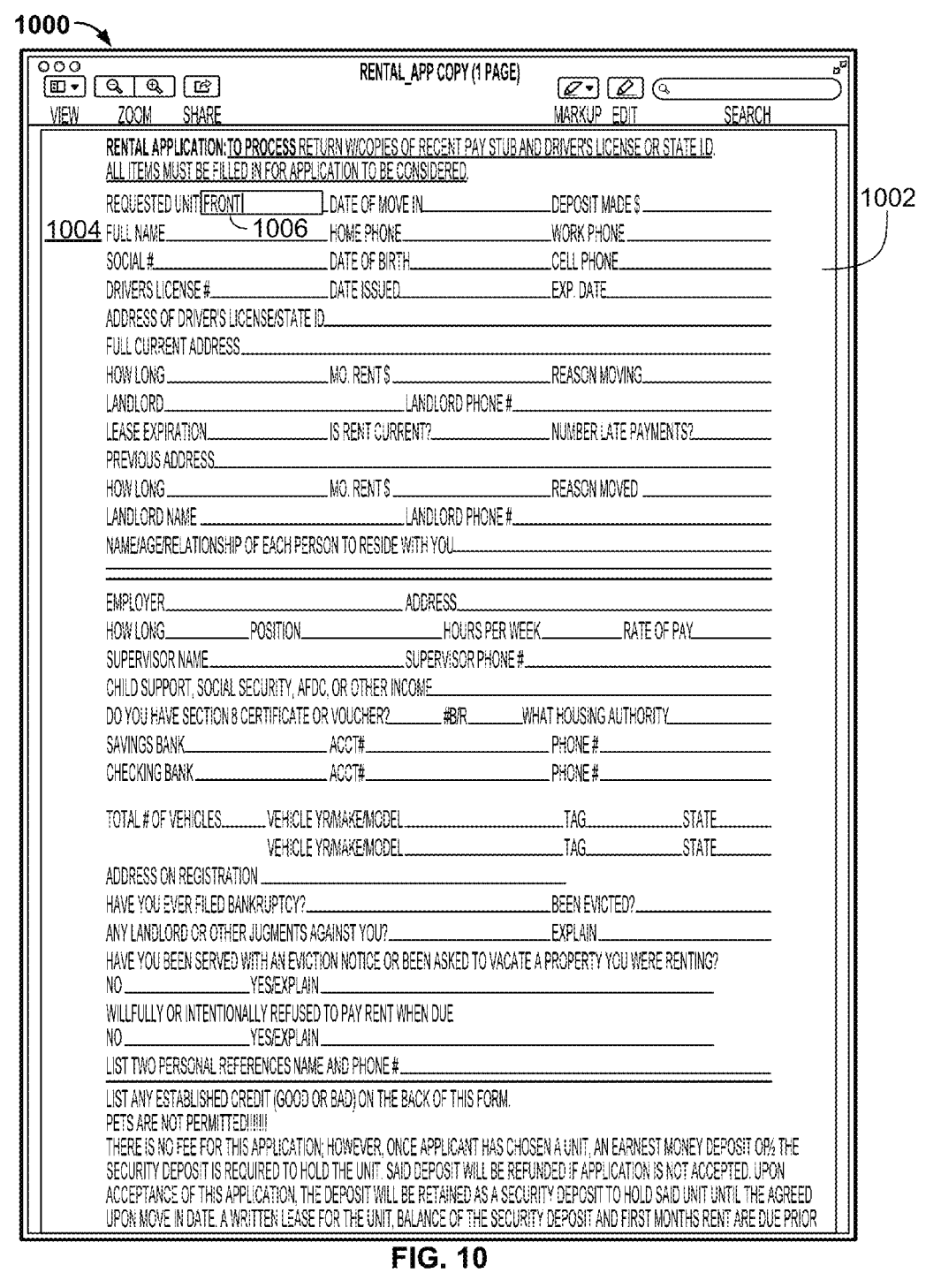

FIG. 10 illustrates an exemplary GUI 1000 depicting a document 1002 with an electronically editable form field 1004. The electronically editable form field 904 is shown with content 1006 that has been entered into the electronically editable form field. The user can continue digitizing other non-digitized form fields in the document 1002. The document can be saved, e.g., as a file on a computing device, with the information that the user enters into the electronically editable form fields. The document, along with the information that the user enters into the electronically editable form fields, can also be printed into a hard copy format.

Exemplary Techniques for Automated Contextual Form Generation

FIGS. 11-14 illustrate example techniques for identifying a check box. Each technique can be used independently or in combination with one or more other techniques.

Figure 11:
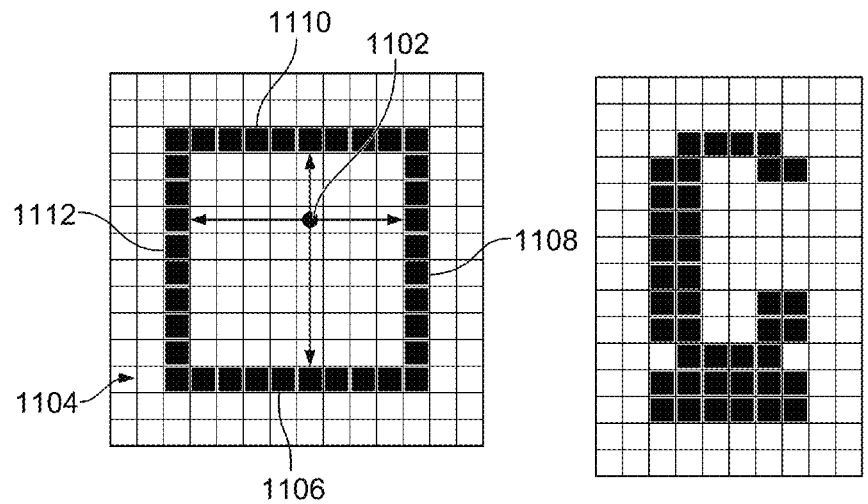
FIGS. 11-14 illustrate example techniques for identifying a check box.

FIG. 11 illustrates an example technique for identifying a check box 1104. FIG. 11 depicts a portion of a document that has been converted into a binarized image format. In FIG. 11, a check box 1104 is identified by identifying edges 1106, 1108, 1110, and 1112 corresponding to the check box 1104. In some implementations, the edges 1106, 1108, 1110, and 1112 corresponding to the check box field 1104 are determined by scanning pixels in the binarized image file, beginning from a position 1102 selected by a user, and determining a white pixel count in an upward, downward, leftward, and rightward direction from the position 1102.

A white pixel count for a particular direction can be determined by counting each white pixel in the particular direction, beginning from the position 1102, until a black pixel is reached. For example, in FIG. 11, for the upward direction, a black pixel is reached when the edge 1110 is reached. The white pixel counts for each direction can be used to measure the pixel distances of edges 1106, 1108, 1110, and 1112 from the position 1102. For example, in FIG. 11, the white pixel count for the upward direction is 2, the white pixel count for the rightward direction is 3, the white pixel count for the downward direction is 5, and the white pixel count for the leftward direction is 4.

Figure 12:
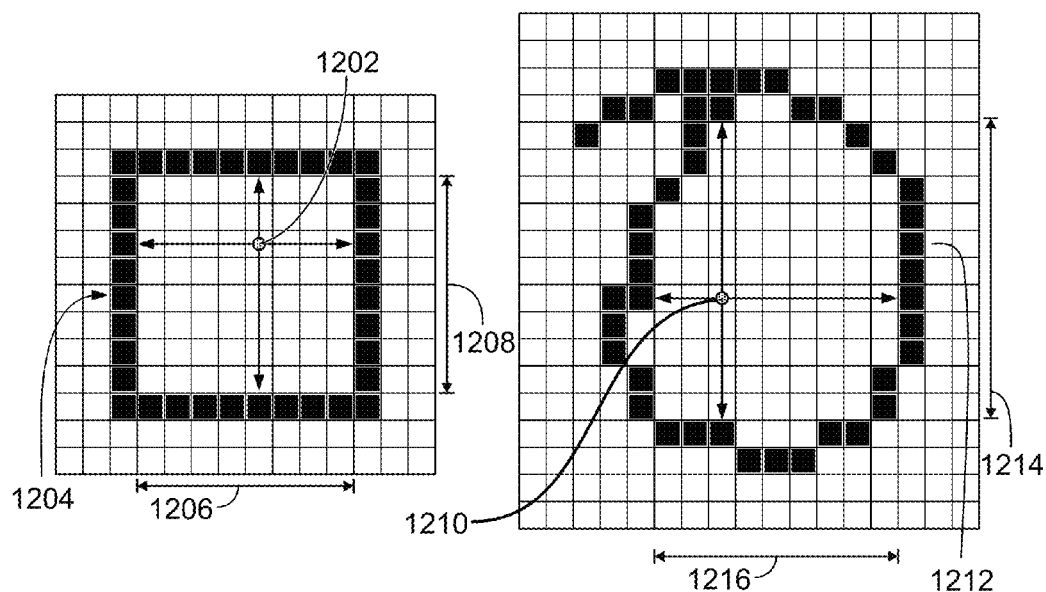

FIG. 12 illustrates an example technique for identifying a check box 1204 and 1212. FIG. 12 depicts a portion of a document that has been converted into a binarized image format. In FIG. 12, a check box 1204 is identified by determining whether the size of a region defined by a position 1202 that was selected by a user is within a threshold range. In some implementations, the size of a region is determined based on a horizontal extent for the position and a vertical extent for the position.

A vertical extent 1206 for the position 1202 can be determined by determining white pixel counts, beginning from the position 1202, in the upward direction and in the downward direction plus the pixel that includes the position 1202. Similarly, a horizontal extent 1208 for the position 1202 can be determined by determining white pixel counts, beginning from the position 1202, in the leftward direction and in the rightward direction plus the pixel that includes the position 1202. For example, in FIG. 12, the horizontal extent is eight pixels, which is the sum of the rightward white pixel count of three pixels and the leftward white pixel count of four pixels plus one pixel that includes the position. The vertical extent is also eight pixels, which is the sum of the upward white pixel count of two pixels and the downward white pixel count of five pixels plus one pixel that includes the position.

A check box 1202 can be identified if the horizontal extent 1206 and the vertical extent 1208 each satisfy a threshold range. In some implementations, horizontal and vertical extents satisfy a threshold range when each count is greater than or equal to four pixels and less than or equal to twenty pixels.

In some implementations, a check box is identified by determining whether an aspect ratio for the check box satisfies a threshold. The aspect ratio can be determined using the horizontal extent and the vertical extent. In some implementations, an aspect ratio satisfies a threshold if the aspect ratio is less than or equal to 2.

Figure 13:
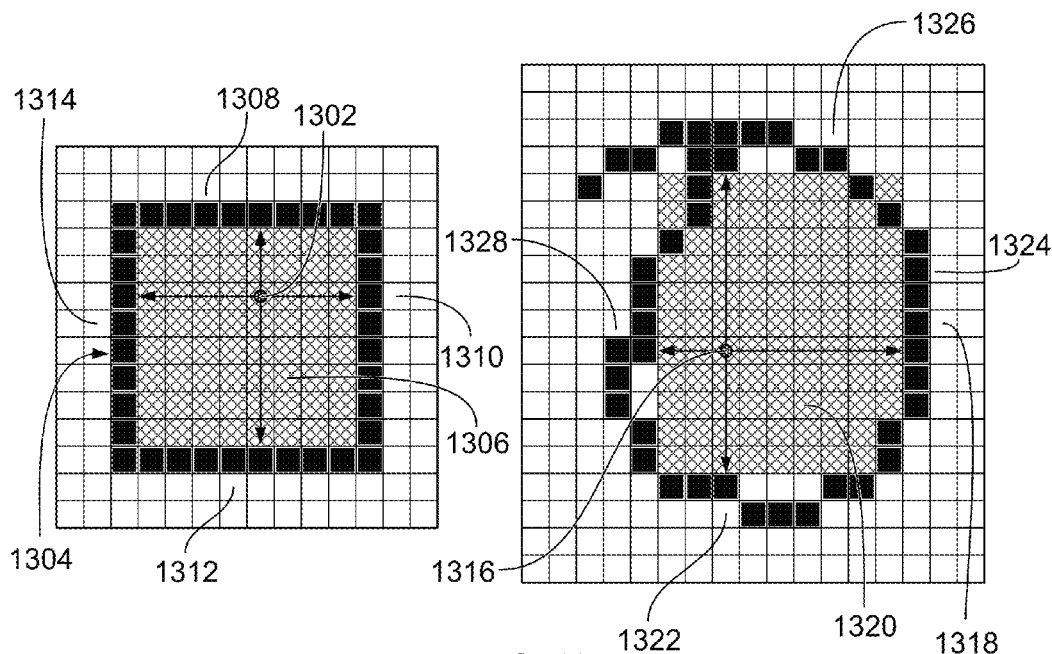

FIG. 13 illustrates an example technique for identifying a check box 1304 and 1310. FIG. 13 depicts a portion of a document that has been converted into a binarized image format. In some implementations, a check box is identified by determining whether a count of black pixels within a region satisfies a threshold. In some implementations, the threshold is satisfied if the number of black pixels is less than five, e.g., 0, 1, 2, 3, or 4. In some implementations, a region is defined based on pixels included in an area having a height equal to the vertical extent originating from a particular position and by having a width equal to the horizontal extent originating from the particular position.

For example, a check box 1304 has edges 1308, 1310, 1312, and 1314 as determined from a position 1302. The position 1302, which can be based on a user selection, in the check box 1304 is used to determine the vertical and horizontal extents for the check box 1304. In FIG. 13, the check box 1304 has a vertical extent of eight pixels and a horizontal extent of eight pixels. The region 1306 for check box 1304 includes all of the pixels within the area defined by the vertical and horizontal extents. A count of black pixels that fall within the region 1306 can be determined. In FIG. 13, the check box 1304 is depicted as having no black pixels within the region 1306.

FIG. 13 also depicts a text character 1318. The text character 1318 has edges 1322, 1324, 1326, and 1328 as determined from a position 1316. The position 1316, which can be based on a user selection, in the text character 1318 is used to determine the vertical and horizontal extents for the text character 1318. In FIG. 13, the text character 1318 has a vertical extent of eleven pixels and a horizontal extent of nine pixels. The region 1316 for check box 1318 includes all of the pixels within the area defined by the vertical and horizontal extents. A count of black pixels that fall within the region 1316 can be determined. As depicted, the text character 1318 has seven black pixels within the region 1316. Since the number of black pixels exceeds a threshold count, the text character 1318 can be classified as not being a check box.

Figure 14:
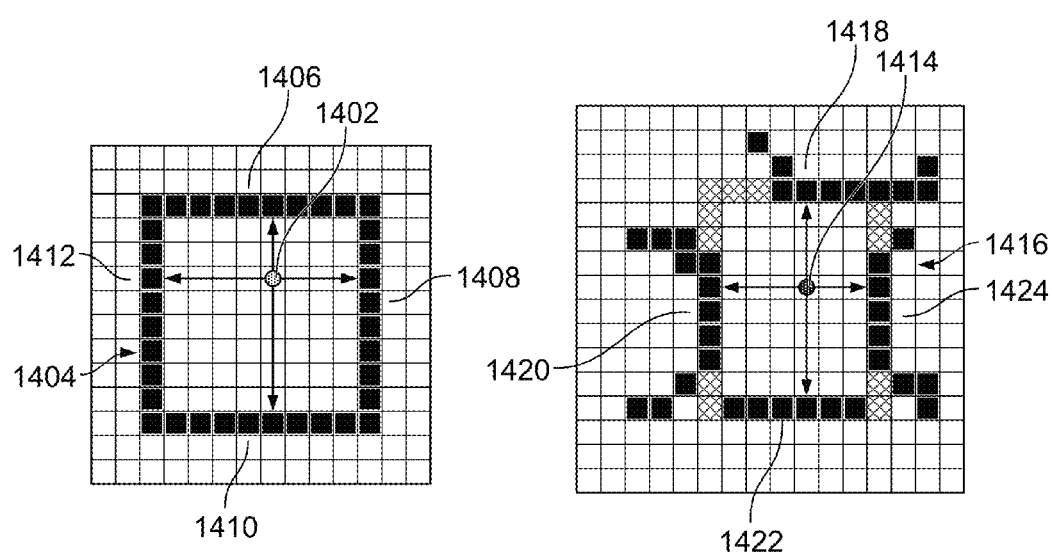

FIG. 14 illustrates an example technique for identifying a check box. FIG. 14 depicts a portion of a document that has been converted into a binarized image format. In some implementations, a check box is identified by determining whether a count of white pixels located along edges of a check box satisfies a threshold. In some implementations, the threshold is satisfied if the number of white pixels is less than five, e.g., 0, 1, 2, 3, or 4.

FIG. 14 depicts a check box 1404 that has edges 1406, 1408, 1410, and 1412, as determined from a position 1402. The position 1402, which can be based on a user selection, in the check box 1404 is used to determine the edges 1406, 1408, 1410, and 1412. In FIG. 14, the edges 1406, 1408, 1410, and 1412 of check box 1404 do not contain any white pixels. Thus, the total white pixel count for the check box 1404 is zero.

FIG. 14 also depicts an area 1416 that has edges 1418, 1420, 1422, and 1424, as determined from a position 1414. The position 1414, which can be based on a user selection, in the area 1416 is used to determine the edges 1418, 1420, 1422, and 1424. In FIG. 14, there are three white pixels located along the edge 1418, five white pixels located along the edge 1420, two white pixels located along the edge 1422, and four white pixels located along the edge 1424. White pixels shared between edges can be counted once. Thus, the total white pixel count for the area 1416 is eleven pixels. Based on the white pixel count exceeding the threshold, the area 1416 can be classified as not being a check box.

Figure 15:
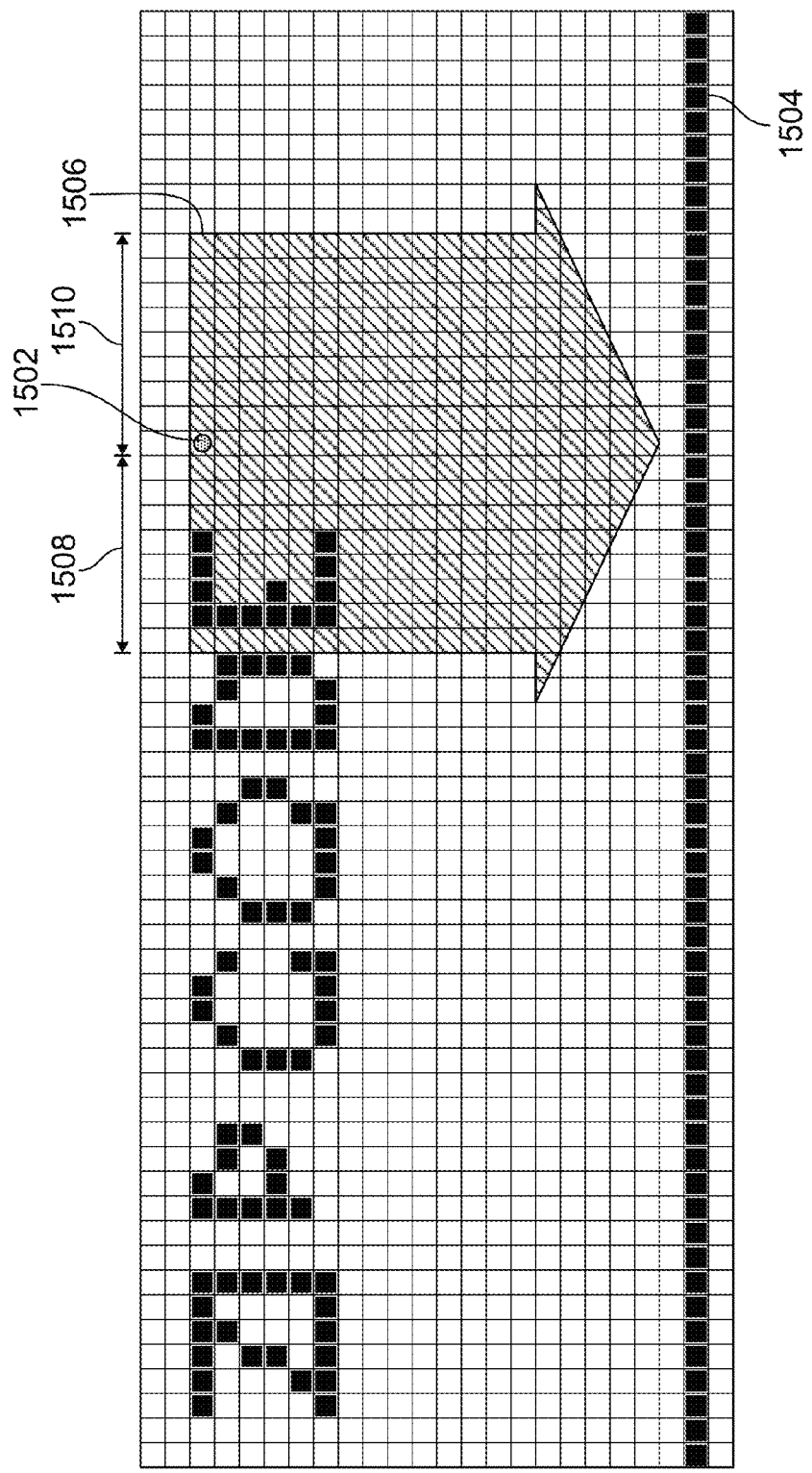
FIGS. 15-17 illustrate example techniques for identifying a line.
Figure 16:
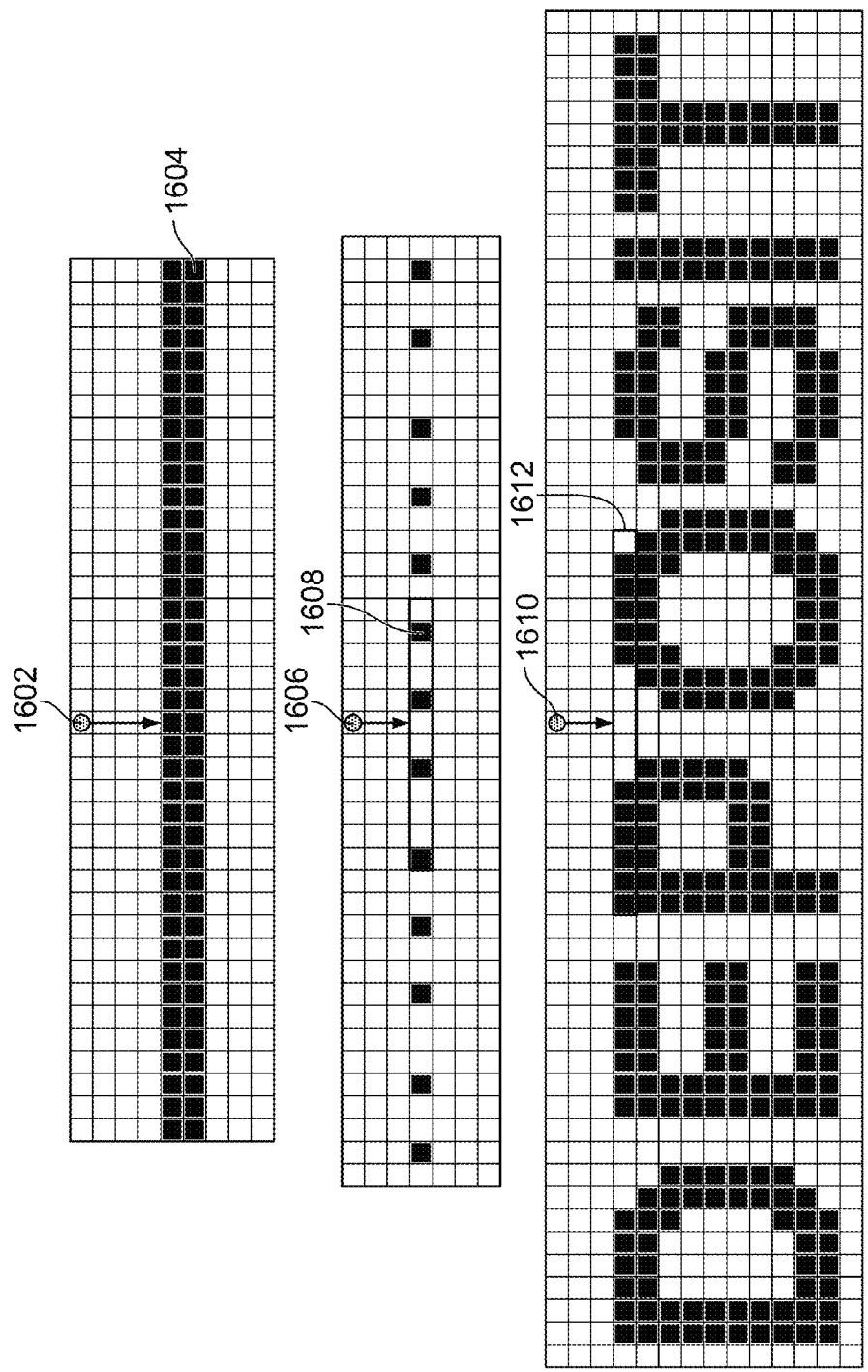
Figure 17:
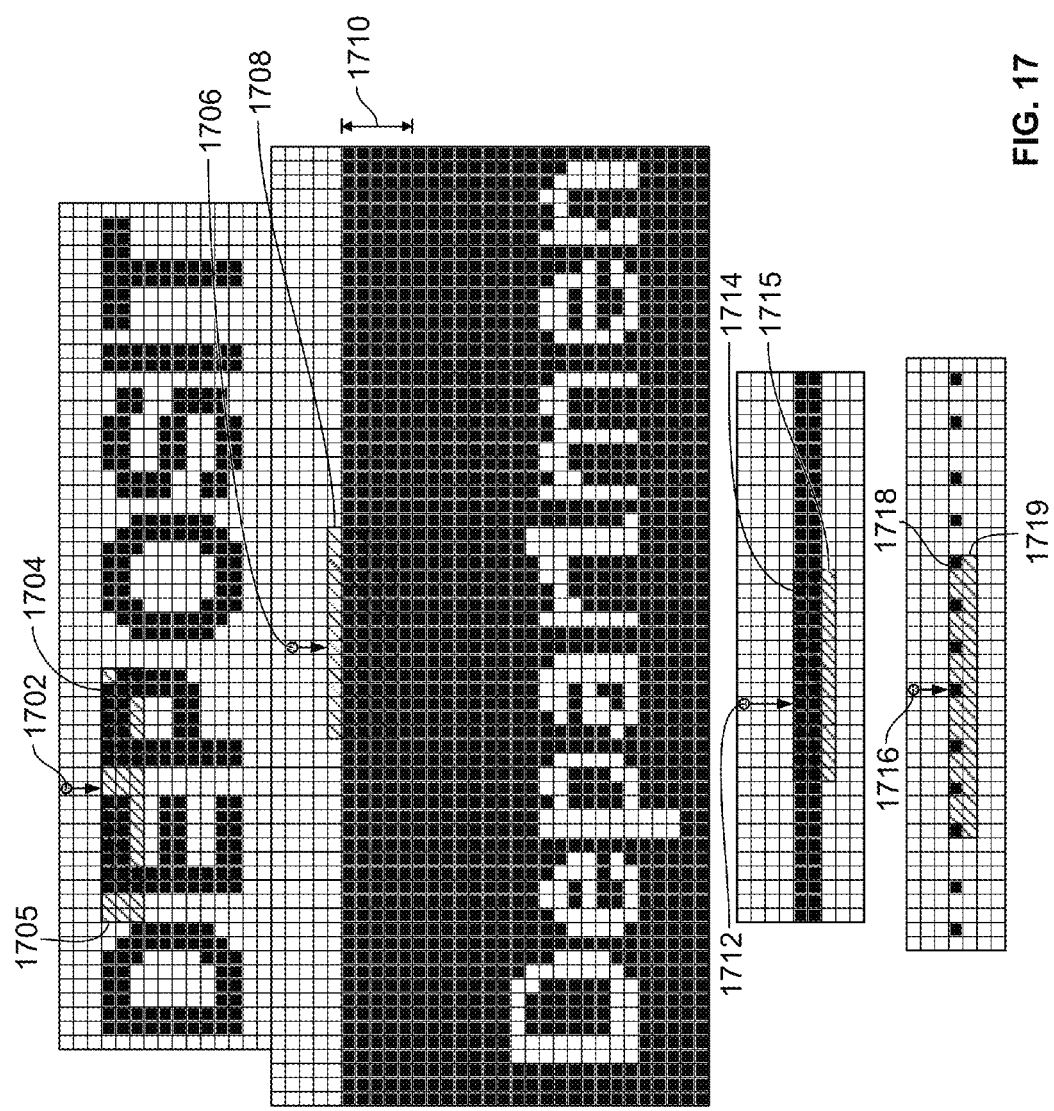

FIGS. 15-17 illustrate example techniques for identifying a line. Each technique can be used independently or in combination with one or more other techniques.

FIG. 15 illustrates an example technique for identifying a line 1504. FIG. 15 depicts a portion of a document that has been converted into a binarized image format. In FIG. 15, a line is detected by scanning downward from a position 1502, where the position 1502 can be based on a user selection, until a slice of black pixels, e.g., a row of black pixels, of a specified length is found. The slice of black pixels can be a contiguous row of black pixels.

The scanning from the position 1502 can be accomplished by scanning each row of pixels, beginning with the row of pixels 1506, which includes the position 1502, until a slice of black pixels of the specified length is found. The rows of pixels can each be of the same specified length as the slice of black pixels. In some implementations, the specified length of a row is between 10 and 20 pixels, e.g., 12, 14, 16, or 18 pixels. The specified length can be divided into two, where each side of the position 1502 can include the same number of pixels. For example, the position 1502 can include eight pixels on the left side and eight pixels on the right side.

In FIG. 15, each row is scanned, beginning from the row 1506, until the slice of black pixels 1504 is reached. The slice of black pixels 1504 can be classified as a line since the slice of black pixels 1504 includes a count of black pixels of the specified length.

FIG. 16 illustrates an example technique for identifying a line 1504. FIG. 16 depicts a portion of a document that has been converted into a binarized image format. FIG. 16 illustrates a technique of identifying a line that may not include a contiguous row of black pixels. In some implementations, a slice of black pixels is tested to identify a count of white pixels that are located in the slice of black pixels. A slice of black pixels can be declassified as a line if the count of white pixels in the slice of black pixels satisfies a threshold.

For example, in FIG. 16, scanning is performed in a downward direction beginning from a position 1602 until a slice of black pixels 1604 is reached. The slice of black pixels 1604 is tested to determine a count of white pixels that are located within the slice of black pixels. In FIG. 16, the slice of black pixels 1604 does not include any white pixels and therefore may be classified as a line.

In another example, in FIG. 16, scanning is performed in a downward direction beginning from a position 1606 until a slice of black pixels 1608 is reached. The slice of black pixels 1608 is tested to determine a count of white pixels that are located within the slice of black pixels. In FIG. 16, the slice of black pixels 1608 is depicted as a dotted line in which the count of white pixels is within a threshold, and therefore the slice 1608 may be classified as a line.

In yet another example, in FIG. 16, scanning is performed in a downward direction beginning from a position 1610 until a slice of black pixels 1612 is reached. The slice of black pixels 1612 is tested to determine a count of white pixels that are located within the slice of black pixels. In FIG. 16, the slice of black pixels 1612 is depicted as text in which the count of white pixels exceeds a threshold, and therefore the slice 1612 is not classified as a line.

FIG. 17 illustrates an example technique for identifying a line 1504. FIG. 17 depicts a portion of a document that has been converted into a binarized image format.

In some implementations, once a line is identified, further scanning can be performed to determine the consistency of subsequent slices of black pixels, i.e., the thickness of the line. If the subsequent slices of black pixels are inconsistent with respect to the count of black pixels in each slice, then the slices can be declassified as a line. In FIG. 17, scanning is performed beginning from position 1702 until a slice of black pixels 1704 is reached. Further scanning of subsequent rows 1705 can be performed to determine whether the slice of black pixels 1704 is or is not a line. In FIG. 17, the subsequent rows 1705 contain inconsistent counts of black pixels and, therefore, the slice of black pixels 1704 can be declassified as a line.

In some implementations, subsequent slices of black pixels that contain a consistent count of black pixels are declassified as a line when the count of subsequent slices of black pixels exceeds a threshold. In some implementations, the threshold is a value less than or equal to 5, e.g., 1, 2, 3, 4, or 5. For example, in FIG. 17, scanning is performed beginning from a position 1706. The scanning reaches several slices of black pixels 1708. The slices of black pixels 1708 are depicted as exceeding a threshold 1710 and, thus, can be declassified as a line.

In cases where a slice of black pixels is found and where a count of subsequent slices of black pixels is within a threshold, then reaching a slice composed entirely of white pixels after the slices of black pixels can further indicate that the slice of black pixels is a line. For example, in FIG. 17, scanning is performed beginning from a position 1712 and slices of black pixels 1714 are reached. The slices of black pixels 1714 are followed by a slice composed entirely of white pixels. Thus, the slice of black pixels 1714 can be classified as a line. In another example, in FIG. 17, scanning is performed beginning from a position 1716 until a slice of black pixels 1718 is reached. Since the slice of black pixels 1718 is followed by a slice composed entirely of white pixels, the slice of black pixels 1718 can be classified as a line.

Figure 18:
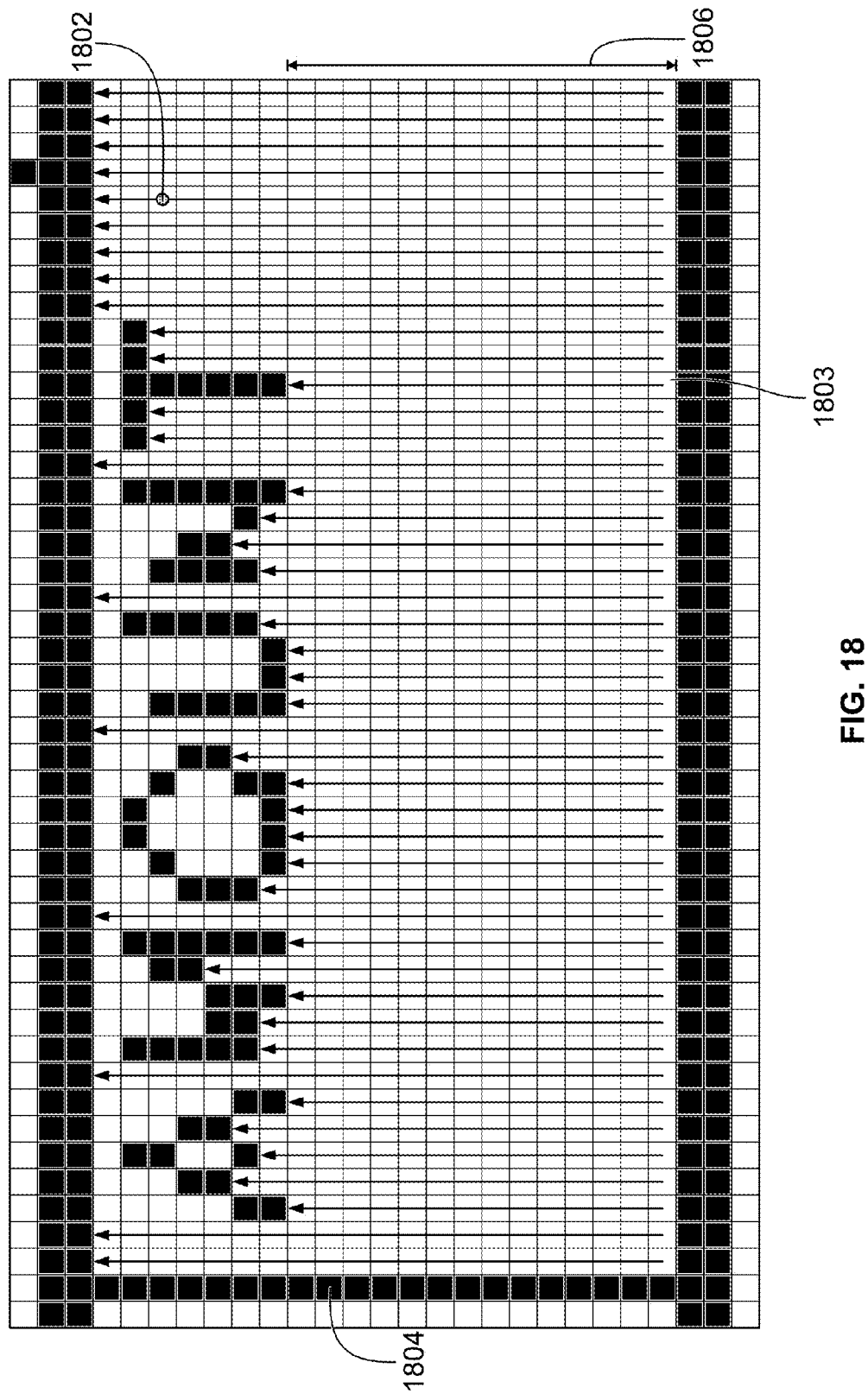
FIGS. 18-20 illustrate example techniques for determining parameters for a region.
Figure 19:
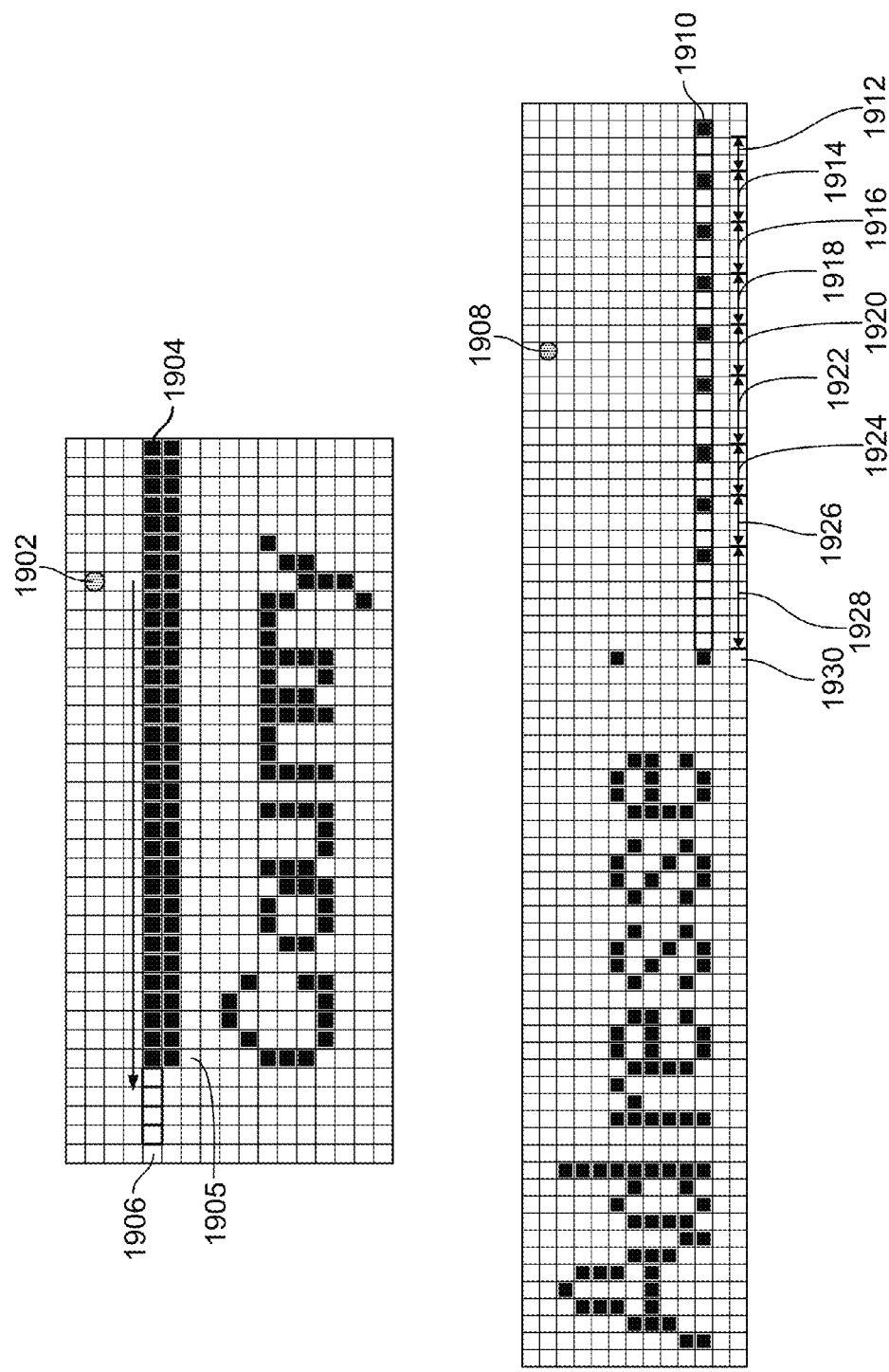
Figure 20:
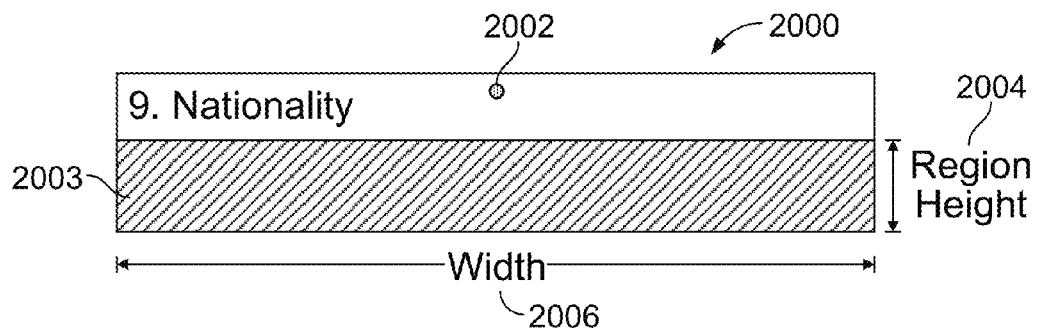

FIGS. 18-20 illustrate example techniques for determining parameters for a region. Each technique can be used independently or in combination with one or more other techniques.

FIG. 18 illustrates an example technique for determining a height for a region. In some implementations, a height for a region is determined by scanning columns of pixels and identifying the column of pixels having a minimum height. The scanning can originate from a position selected by a user and can continue in a leftward and rightward direction until certain criteria has been satisfied. Each pixel in a column of pixels can be scanned beginning from a baseline, e.g., a line that was identified using techniques described in reference to FIGS. 15-17, and continuing to scan each pixel in the column of pixels in an upward direction until the first black pixel is reached. The height of a column of pixels can be defined by a count of white pixels that were traversed until the first black pixel was reached.

In FIG. 18, columns of pixels are scanned in a leftward and rightward direction originating from the position 1802. In particular, each pixel in each column of pixel is scanned beginning from a baseline and continuing in an upward direction until the first black pixel is reached. In FIG. 18, the minimum height 1806 for the region 1803 is established based on the columns of pixels.

In some implementations, the scanning of columns of pixels is halted if a height of a column of pixels is less than a threshold height. In some implementations, the threshold height is less than ten pixels, e.g., 5, 6, 7, 8, or 9 pixels. In some implementations, the scanning of columns of pixels is halted if a column of pixels is composed entirely of black pixels, e.g., a vertical line 1804.

FIG. 19 illustrates an example technique for determining a width for a region. In some implementations, a width for a region is established by determining the left and right ends of the line. The ends of a line can be determined by scanning a baseline, e.g., a line that was identified using techniques described in reference to FIGS. 15-17, in a leftward and rightward direction until a threshold number of blanks, e.g., white pixels, are found. The baseline can be scanned, pixel by pixel, as a single line or as columns of pixels that together make up a line. In some implementations, the threshold number of blanks for determining an end of a line is a number greater than 3, e.g., 4, 5, 6, 7, 8, 9, or 10.

A count of black pixels that were included in the baseline can be maintained during the scanning and can be used to determine the width of the baseline. The width of a baseline can be defined by a count of black pixels that were traversed until the threshold number of blanks was reached.

In FIG. 19, a baseline 1904 is scanned in a leftward and rightward direction originating from the position 1902. In particular, each pixel in the baseline is scanned in a leftward direction beginning from the position 1902 and continuing until the threshold number of blanks 1906 is found for the leftward direction. The end 1904 of the baseline 1904 can be determined upon reaching the threshold number of blanks 1906.

A baseline need not contain a contiguous row of black pixels. In some implementations, gaps in between columns of pixels that make up a baseline can be measured to determine whether the baseline is a dotted line. Gaps that fall within a threshold range can be ignored in determining the width of a baseline that does not contain a contiguous row of black pixels, e.g., a dotted line. In some implementations, a threshold range for a gap is between 1 and 6 pixels, e.g., 2, 3, 4, or 5.

In FIG. 19, a dotted baseline 1910 is scanned in a leftward and rightward direction, beginning from a location identified using the position 1908, e.g., a position halfway in between columns of pixels 1920 and 1922, to determine a width for the baseline 1910. In some implementations, a width for a dotted region is established by determining the left and right ends of the dotted line. The ends of a line can be determined by scanning a baseline, e.g., a line that was identified using techniques described in reference to FIGS. 15-17, in a leftward and rightward direction until a threshold number of blanks, e.g., white pixels, are found while ignoring gaps in between the columns of pixels 1912, 1914, 1916, 1918, 1920, 1922, 1924, 1926, 1928, and 1930 that make up the baseline. In FIG. 19, the gaps formed by the columns of pixels 1914, 1914, 1916, 1918, 1920, 1922, 1926, and 1928 are within a threshold range. The gap formed by the columns of pixels 1928 and 1930, however, is depicted as not being within the threshold range and, thus, the column of pixels 1928 is identified as the end of the baseline 1910 for the leftward direction.

FIG. 20 illustrates an example region 2003 defined for a detected form field 2000 using one or more techniques. In FIG. 20, the region 2003 for the form field 2000 is defined in response to a user selection 2002 by determining a height 2004 for the region 2003 and a width 2006 for the region 2003. The height and width for a region can be determined using techniques for determining a height and width for a region. The region 2003 can be defined as a potential region where information, e.g., text, may be entered.

Figure 21:
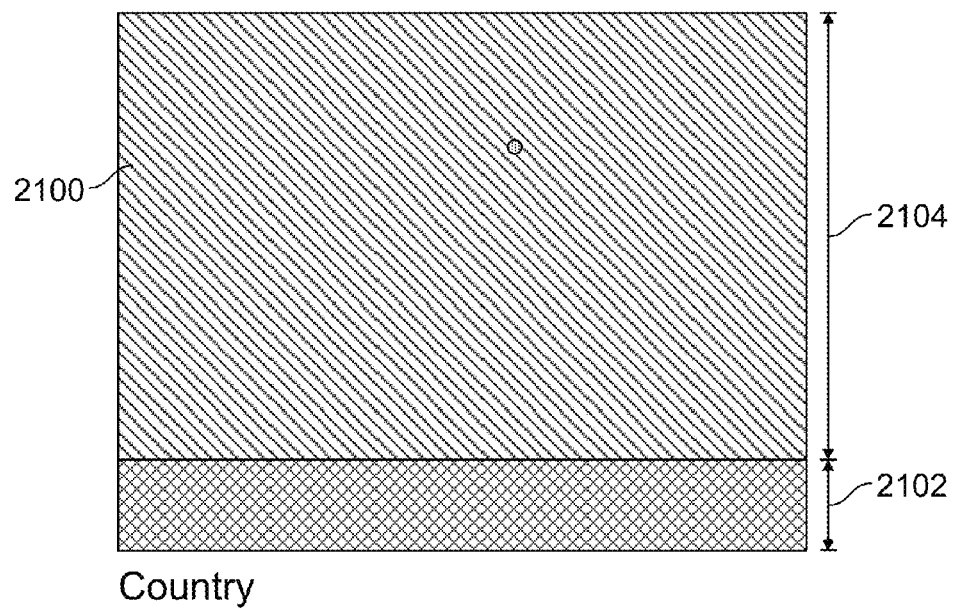
FIGS. 21 and 22 illustrate classification of a region as a large or non-large region.
Figure 22:
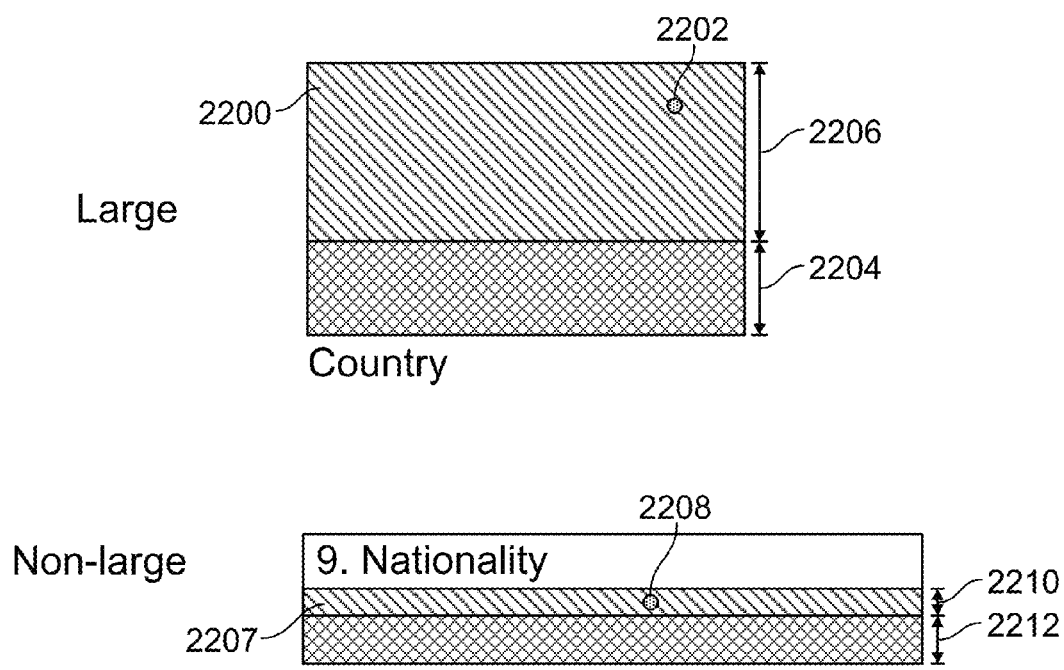

FIGS. 21 and 22 illustrate classification of a region as a large or non-large region. The classification of a region as a large or non-large region can be used to determine the bounds for the region.

FIG. 21 illustrates classification of a region. In some implementations, the bounds of a region are determined by classifying a region, as defined in response to a user selection described in reference to FIG. 20, as a large region or a non-large region. In some implementations, a region is classified as a large region or a non-large region by comparing the height of the potential region for the region to a threshold height for the region, e.g., a default feature size for a page. If the height of the potential region is greater than 2, e.g., 2.1, 2.2, 2.3, 2.4, 2.5, or 2.6 times the height of the threshold height, the region can be classified as a large region. Otherwise, the region can be classified as a non-large region.

In FIG. 21, the region 2100 is depicted with its potential region height 2104 and a threshold height 2102. Both the potential region 2104 and the threshold region 2102 share the same lower edge. In particular, the potential region 2104 is clamped to a maximum height for the region 2100. In some implementations, the height used to clamp the potential region 2104 is based on the type of font and font size that will be used to populate the form field. A comparison can be made between the potential region height 2104 and the threshold height 2102 to classify the region 2100 as a large region or a non-large region.

FIG. 22 illustrates classification of a region by comparing a ratio of the height of the potential region to a threshold height. In some implementations, if the ratio is greater than 2, e.g., 2.1, 2.2, 2.3, 2.4, 2.5, or 2.6 times the height of the threshold height, then the region can be classified as a large region. In FIG. 22, a region 2200, as defined in response to a user selected position 2202, is classified by comparing the height of the potential region 2206 for the region 2200 to a threshold height 2204 for the region 2200. Both the potential region 2206 and the threshold region 2204 share the same lower edge. Since the height of the potential region 2206 is depicted as being greater than twice the height of the threshold height 2204, the region 220 can be classified as a large region.

FIG. 22 also depicts a region 2207, as defined in response to a user selected position 2208, is classified by comparing the height of the potential region 2210 for the region 2207 to a threshold height 2204 for the region 2207. Both the potential region 2210 and the threshold region 2204 share the same lower edge. Since the height of the potential region 2206 is depicted as being less than twice the height of the threshold height 2212, the region 2207 can be classified as a non-large region.

Figure 23:
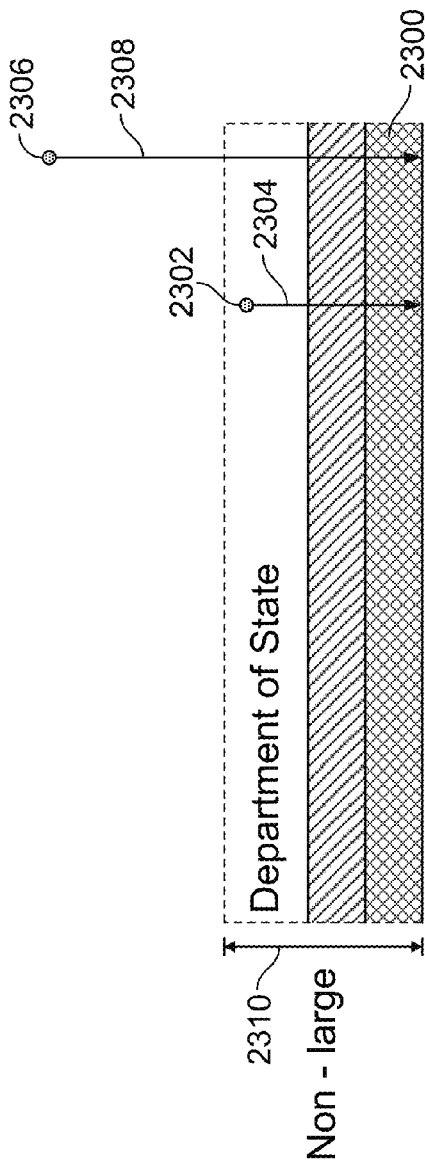
FIG. 23 illustrates a bounding technique for non-large regions.

FIG. 23 illustrates a bounding technique for non-large regions. In some implementations, a user selected position that was used to identify a non-large region is checked to determine whether the non-large region should be digitized. A region can be digitized if a user selected position that was used to identify the region is within a threshold distance from the top of the region. Otherwise, the region may not be digitized. In some implementations, the threshold distance is a less than 12 pixels, e.g., 8, 9, 10, or 11.

FIG. 23 depicts a region 2300 that can be identified in response to example a user selected positions 2302 and 2306. Although only one user selected position is needed to identify a region, both user selected positions 2302 and 2306 are shown for purposes of illustrating threshold distance. In FIG. 23, if the region 2300 was defined in response to the user selected position 2302, the distance 2304 for the user selected position 2302 can be measured from the top of the region 2300. If the distance 2304 is within a threshold distance, then the region 2300 can be digitized. In another example, if the region 2300 was defined in response to the user selected position 2306, the distance 2308 for the user selected position 2306 can be measured from the top of the region 2300. In FIG. 23, the user selected position 2306 is shown outside of a threshold distance 2310, and thus, the region may not be digitized.

Figure 24:
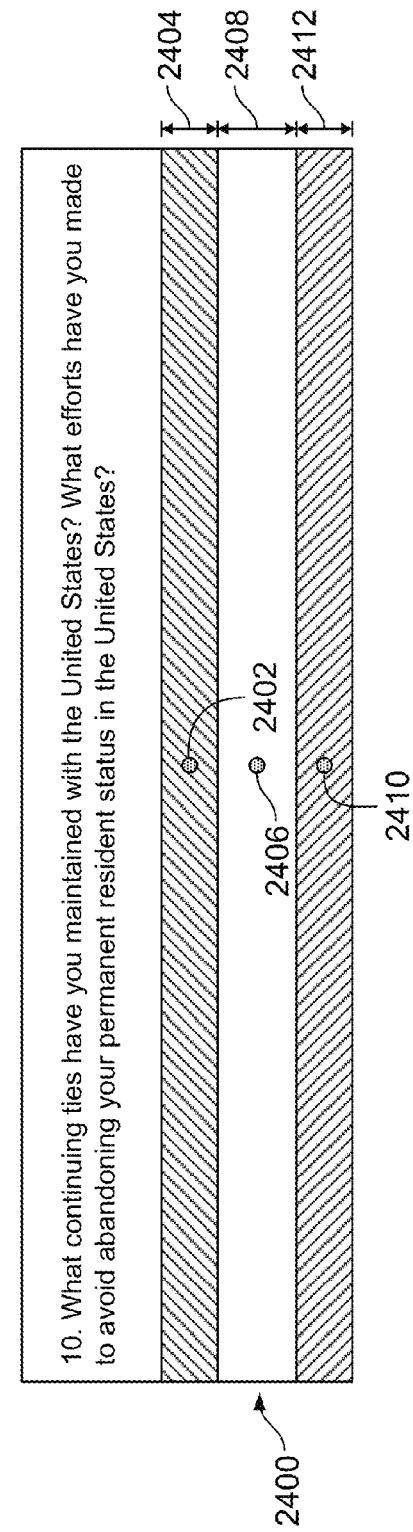
FIG. 24 illustrates a bounding technique for large regions.

FIG. 24 illustrates a bounding technique for large regions. In some implementations, a user selected position that was used to identify a large region is checked to determine digitization parameters for the large region. A user selected position that is near the top of the large region can be digitized as a top-aligned electronically editable form field, e.g., a text field. A top-aligned electronically editable form field can allow the user to enter information using one or more lines and can allowed the user to input newlines. A user selected position that is near the bottom of the large region can be digitized as a bottom-aligned electronically editable form field that includes one or more lines.

FIG. 24 depicts a region 2400 depicted with user selected positions 2402, 2406, and 2410. The user selected position 2402 is depicted as being near the top of the large region 2400. Based on the user selected position 2402, the region 2400 can be digitized as a top-aligned electronically editable form field. The user selected position 2410 is depicted as being near the bottom of the large region 2400. Based on the user selected position 2410, the region 2400 can be digitized as a bottom-aligned electronically editable form field. In some implementations, a region is not digitized when a user selection position is located in the middle of the region. The top, middle, and bottom of a region can be defined in proportion to the region's height. For example, the top and bottom of the region 2412 can be defined based on a threshold pixel percentage, e.g., the top 2404 and bottom 2412 of the region 2412 can be, e.g., the top and bottom 30 percent of pixels, respectively, in the column of pixels defining the region's height while the middle 35 percent of pixels in the column of pixels can be the middle 2408 of the region 2412. In some implementations, a user selected position in the middle 2408 of the region 2412, e.g., the user selected position 2406, results in cancellation of the form field detection process. Instead, a default electronically editable form field can be placed at the user selected position.

Figure 25:
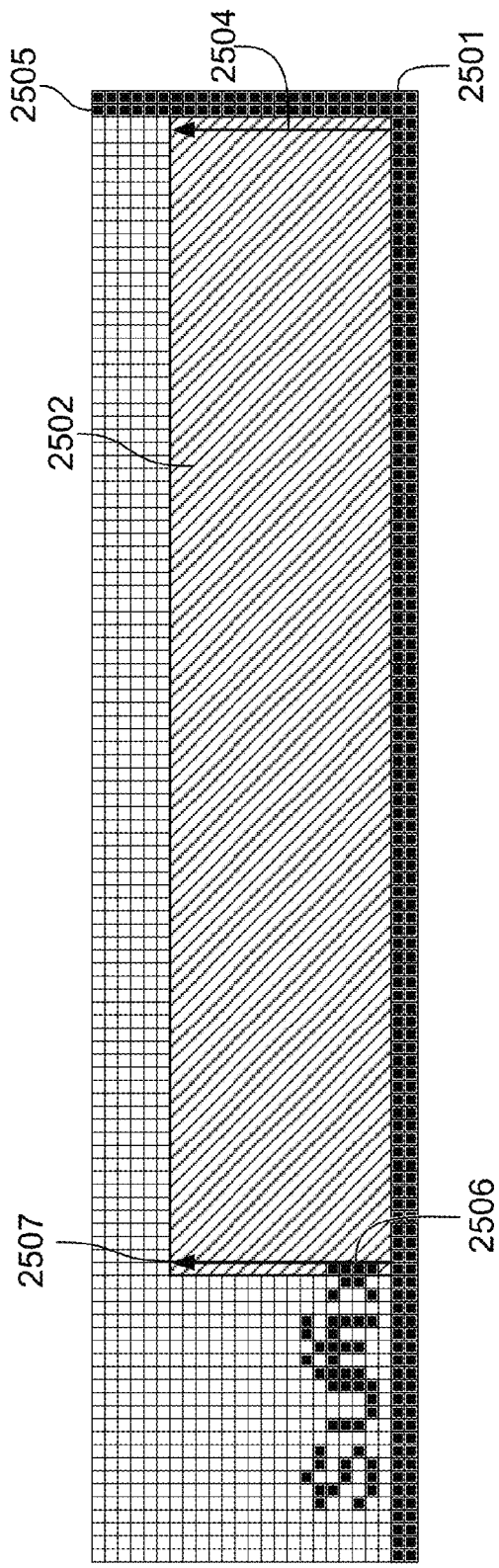
FIG. 25 illustrates an example technique for determining edge types for a region.

FIG. 25 illustrates an example technique for determining edge types for a region 2502. In some implementations, an edge type for an edge is determined for purposes of bounding a region that is defined by the edge. An edge can be classified as an empty space, a solid line, or as text. In some implementations, the edge type for an edge is determined by scanning pixels in the column of pixels that define the edge. The scanning can be performed beginning from a baseline and proceeding in an upward direction until the height of the column of pixels is reached. An edge defined by a column of pixels composed entirely of white pixels can be classified as an empty space. An edge defined by a column of pixels composed entirely of black pixels can be classified as a solid line. An edge defined by a column of pixels composed of a threshold percentage, e.g., less than twenty percent, of black pixels can be classified as text.

In FIG. 25, the region 2502 is defined by a right edge 2504 and a left edge 2506. The edge type for the right edge 2504 can be determined by scanning the column of pixels 2505 that defines the right edge 2504, beginning from the baseline 2501 and continuing in an upward direction until the height of the column of pixels 2505 is reached. In FIG. 25, the column of pixels 2505 is depicted as being composed of all black pixels and, thus, the column of pixels 2505 can be classified as a solid line.

Similarly, the edge type for the left edge 2506 can be determined by scanning the column of pixels 2507 that defines the left edge 2506, beginning from the baseline 2501 and continuing in an upward direction until the height of the column of pixels 2507 is reached. In FIG. 25, the column of pixels 2507 is depicted as being composed of some black pixels and, thus, the column of pixels 2507 can be classified as text.

In some implementations, a region that is classified as a large region, and is assigned a top-aligned electronically editable form field, requires that the left edge and the right edge for the region be solid lines.

Figure 26:
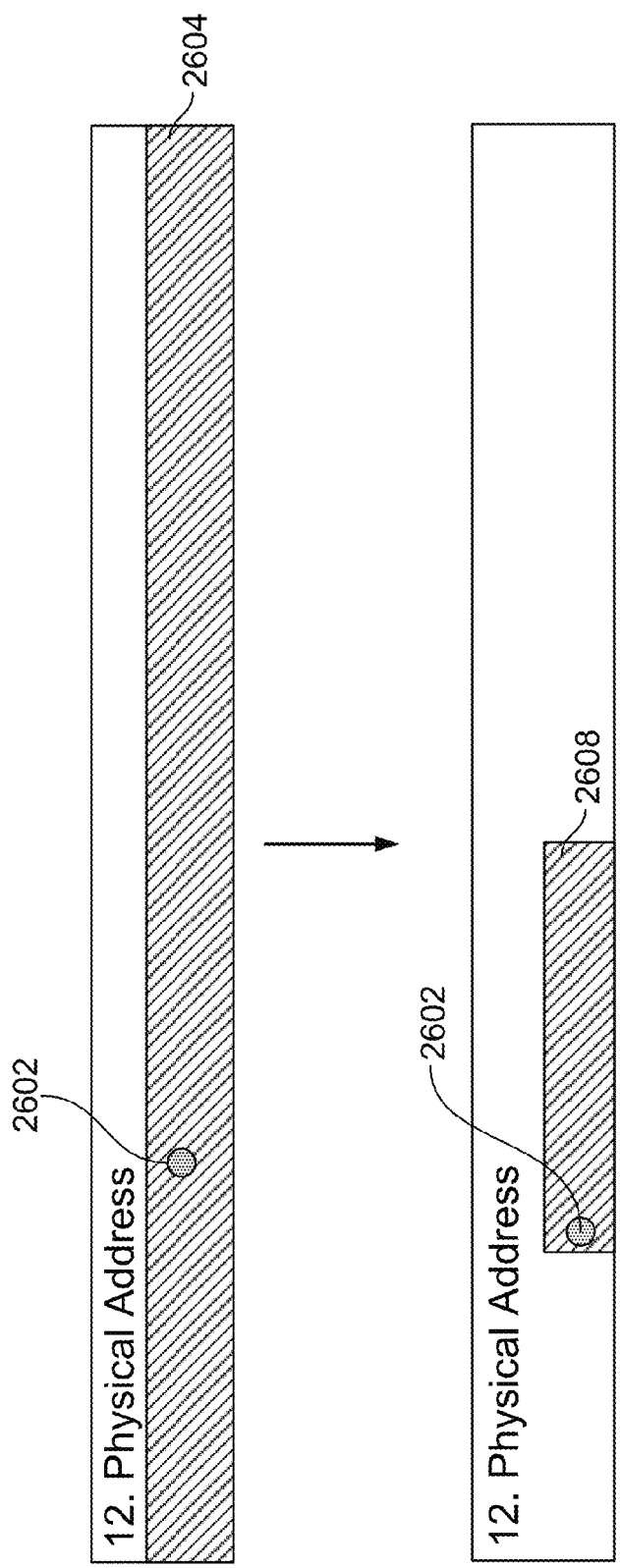
FIG. 26 illustrates an example technique for bounding a width of a region.

FIG. 26 illustrates bounding a width of a region. In some implementations, a region width is required to be greater than a minimum threshold size. In some implementations, the minimum threshold size is a value between 20 and 30 pixels, e.g., 22, 24, 26, or 28 pixels. The minimum threshold size can vary depending on the edge types of the right edge and left edge that define the region. In some implementations, when the right and left edges for a region are both text, the minimum threshold size is a value between 40 and 50 pixels, e.g., 42, 44, 46, or 48 pixels.

In some implementations, a region width that is larger than a maximum threshold size for a document is adjusted to a default width. For example, if the region width is larger than a threshold width, e.g., ½, the width of the page, then the region width can be adjusted to a default width, e.g., ⅓ the width of the page. The height of the region, e.g., unbounded region 2604, can also be adjusted based on the type of font and font size being used to populate the form field.

In FIG. 26, an unbounded region 2604 was identified in response to a user selected position 2602. The unbounded region 2604 is determined to exceed a maximum threshold size and, thus, is bounded using a default width. In response to the determination, the unbounded region 2604 is adjusted to a bounded region 2608 and is placed at a position corresponding to the user selected position 2602.

Figure 27:
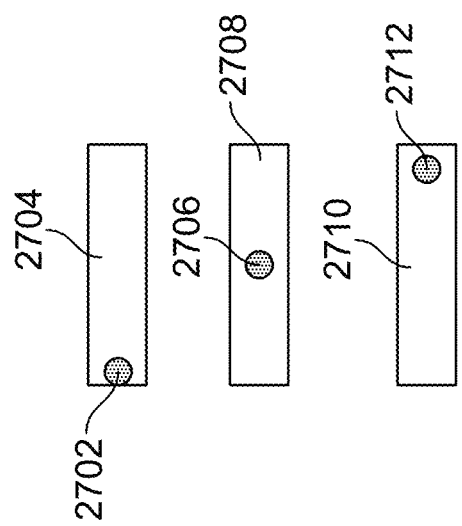
FIG. 27 illustrates positioning of an electronically editable form field relative to a user selected position.

FIG. 27 illustrates positioning of an electronically editable form field relative to a user selected position. In some implementations, the position of an electronically editable form field can be adjusted relative to a user selected position. For example, an electronically editable form field 2704 can be left aligned relative to the user selected position 2702. In another example, an electronically editable form field 2708 can be centered relative to a user selected position 2706. In another example, an electronically editable form field 2710 can be right aligned relative to a user selected position 2712.

Figure 28:
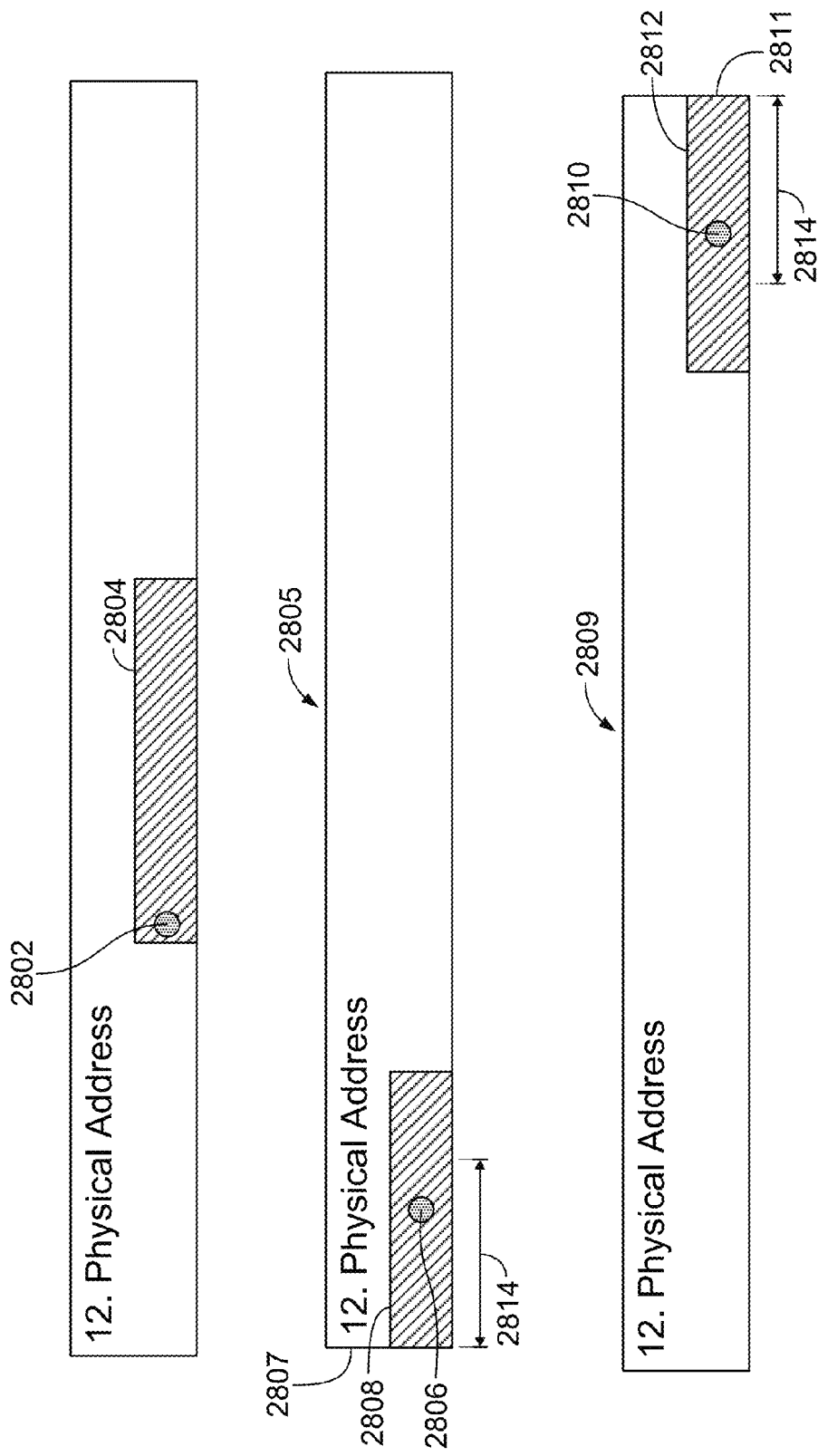
FIG. 28 illustrates positioning of an electronically editable form field in a region.

FIG. 28 illustrates positioning of an electronically editable form field in a region. In some implementations, an electronically editable form field is positioned at the user selected position. For example, as depicted in FIG. 28, an electronically editable form field 2804 is positioned at the user selected position 2802.

In some implementations, electronically editable form fields for a region can be snapped in a position relative to a user selected position. For example, an electronically editable form field can be snapped to a left edge for a region when a user selected position is within a threshold range from the left edge. In some implementations, the threshold value is less than 25 pixels, e.g., 5, 10, 15, or 20 pixels. For example, as depicted in FIG. 28, an electronically editable form field 2808 is snapped to a left edge 2807 since the user selected position 2806 is within a threshold range 2814. Similarly, an electronically editable form field can be snapped to a right edge for a region when a user selected position is within a threshold range from the right edge. For example, as depicted in FIG. 28, an electronically editable form field 2812 is snapped to a right edge 2811 since the user selected position 2810 is within a threshold range 2814.

Exemplary Document Assembly Process

Figure 29:
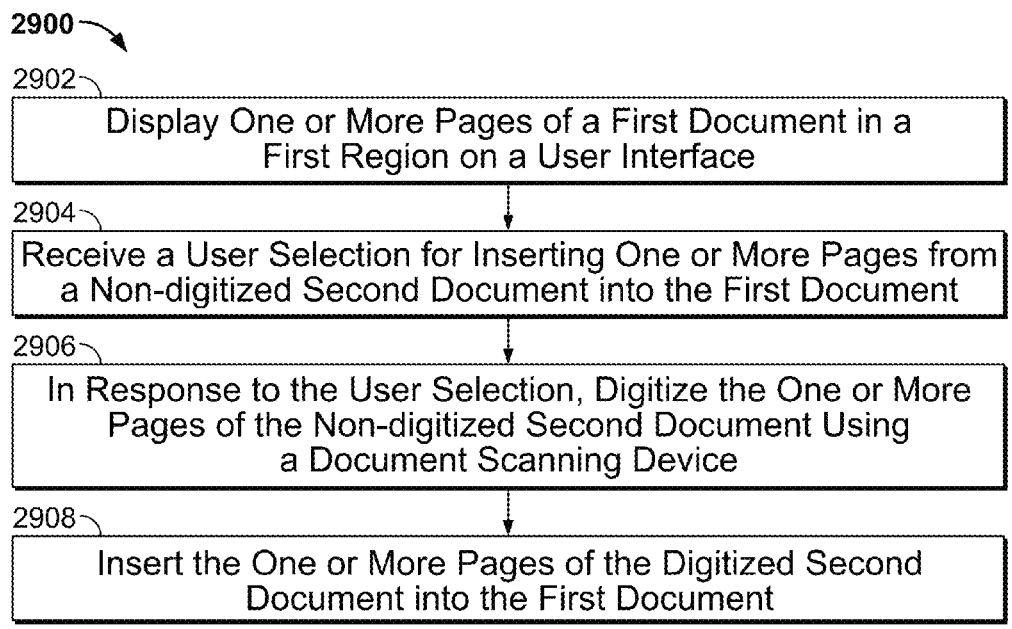
FIG. 29 illustrates an exemplary process for inserting pages from a second document into a first document.

FIG. 29 illustrates an exemplary process 2900 for inserting pages from a second document into a first document. In some implementations, process 2900 can be implemented using the architecture described in reference to FIG. 33.

In some implementations, process 2900 can begin by displaying one or more pages of a first document in a first region on a user interface (2902). The first document can be obtained, for example, from other computing devices, external devices (e.g., cameras, portable hard drives, flash drives, network-attached storage devices), or cloud-based storage systems. Thumbnail images of the one or more pages of the first document can be displayed in a second region on the user interface.

Process 2900 can continue by receiving a user selection for inserting one or more pages from a non-digitized second document into the first document (2904). For example, a user can select an option for inserting pages from the non-digitized second document, e.g., a document that is available as a hard copy, into the first document.

Process 2900 can continue, in response to the user selection, by digitizing the one or more pages of the non-digitized second document using a document scanning device (2906). For example, the non-digitized second document can be digitized using a document scanning device, e.g., a scanning apparatus, that scans the second document into a digital format, e.g., in an image or a portable document format.

Process 2900 can continue by inserting the one or more pages of the digitized second document into the first document (2908). Once inserted, the inserted pages are displayed as part of the first document on the user interface.

Exemplary Automated Contextual Generation Process

Figure 30:
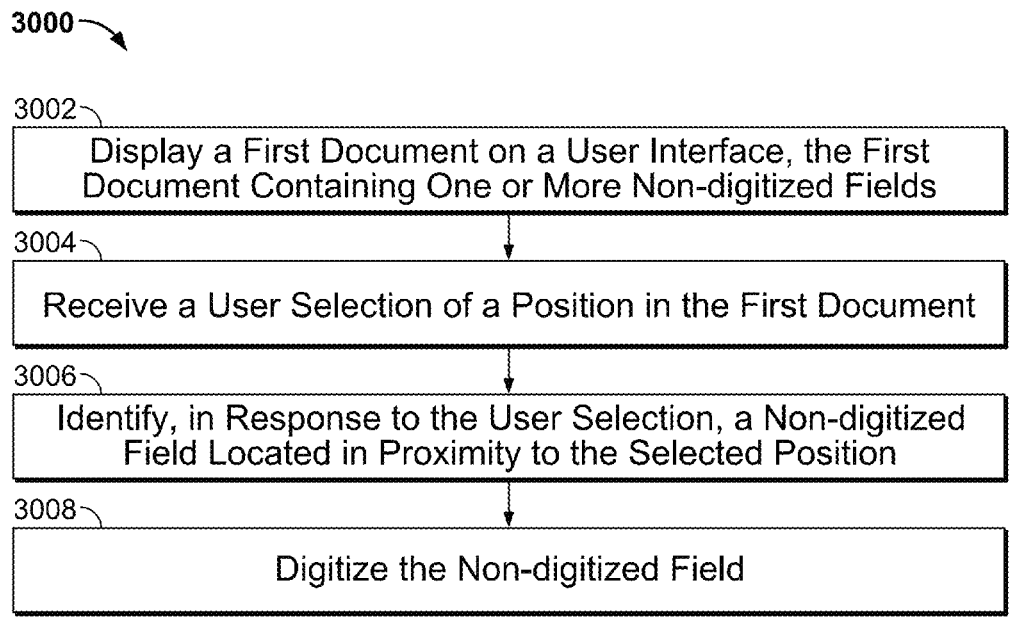
FIG. 30 illustrates an exemplary process for digitizing form fields in response to a user selection.

FIG. 30 illustrates an exemplary process 3000 for digitizing form fields in response to a user selection. In some implementations, process 3000 can be implemented using the architecture described in reference to FIG. 33.

In some implementations, process 3000 can begin by displaying a first document on a user interface, the first document containing one or more non-digitized fields (3002). The non-digitized fields in the first document can be non-digitized form fields or check boxes.

Process 3000 can continue by receiving a user selection of a position in the first document (3004). For example, the user selection can be a mouse click made on a position in the first document.

Process 3000 can continue by identifying, in response to the user selection, a non-digitized field located in proximity to the selected position (3006). The non-digitized field can be, e.g., a check box or a form field. Identification of non-digitized fields is described in reference to FIG. 31.

Process 3000 can continue by digitizing the identified non-digitized field (3008). Depending on the non-digitized field, the digitization can result in converting a non-digitized check box into an electronically editable check box or a non-digitized form field into an electronically editable form field. Electronically editable check boxes can be electronically ticked in response to, e.g., a user selection of the electronically editable check boxes. Users can enter information directly into electronically editable form fields using, e.g., a keyboard device.

Exemplary Digitization Process

Figure 31:
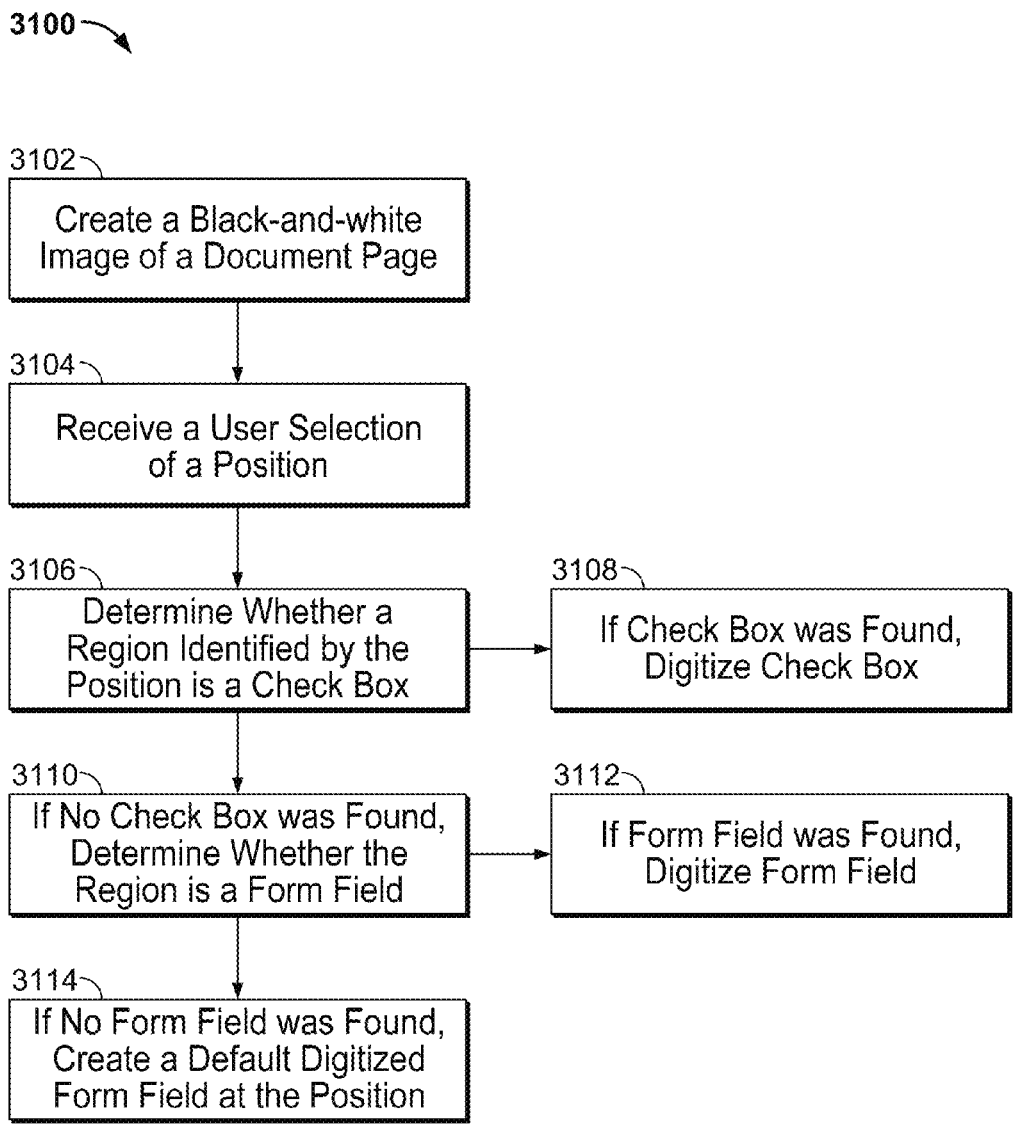
FIG. 31 illustrates an exemplary process for digitizing form fields.

FIG. 31 illustrates an exemplary process 3100 for digitizing fields. In some implementations, process 3000 can be implemented using the architecture described in reference to FIG. 33.

In some implementations, process 3100 can begin by creating a black-and-white image of a document page (3102). A document page can be converted into an image format, e.g., a bitmap file, and can be rendered in a black-and-white color. One example method of rendering a document page into black-and-white involves binarizing the image. The binarization of an image file can result in individual pixels in the image file being marked as "white" pixels if their value is greater than some threshold value and as "black" pixels otherwise. Using the binarized pixels, the image file can be scanned to determine whether a non-digitized field is a check box or a form field.

Process 3100 can continue by receiving a user selection of a position in the document page (3104). For example, the user selection can be a mouse click made on a position in the first document.

Process 3100 can continue by determining whether a region identified by the position is a check box (3106). A determination of whether a region is a check box can be made using techniques described in reference to FIGS. 11-14.

If the region was determined to be a check box, the process 3100 can continue by digitizing the check box (3108). For example, the check box can be digitized by placement of an electronically editable check box at a location defined by the user selected position. The electronically editable check box can be sized according to the non-digitized check box using measurements that were made during the check box detection process, as described in 3106.

If a check box was not found, the process 3100 can continue by determining whether the region is a form field (3110). A form field can be identified by determining whether the region identified by the position includes a line. Line detection can be performed using techniques described in reference to FIGS. 15-17. Once a line is detected, parameters for a region defined by the line can be determined. The parameters can include the height and width of the region and can be determined, e.g., using techniques described in reference to FIGS. 18-20.

Using the parameters of the region, the region can be classified as a large or non-large region using techniques described in reference to FIGS. 21-22. Classification of the region as a large region or a non-large region can affect how the form field in the region is digitized. In some implementations, a user selected position that was used to identify a non-large region can be checked to determine whether the non-large region should be digitized, as described in reference to FIG. 23.

In some implementations, a user selected position that was used to identify a large region can be checked to determine digitization parameters for the large region, as described in reference to FIG. 24. For example, a user selected position that is near the top of the large region can be digitized as a top-aligned electronically editable form field, e.g., a text field. A top-aligned electronically editable form field can allow the user to enter information using one or more lines and can allowed the user to input newlines. A user selected position that is near the bottom of the large region can be digitized as a bottom-aligned electronically editable form field that includes one or more lines.

In some implementations, the edge types for the region are determined. Edge types can be determined using techniques described in reference to FIG. 25. In some implementations, a region that is classified as a large region, and is assigned a top-aligned electronically editable form field, requires that the left edge and the right edge for the region be solid lines. If the left and/or right edges are not solid lines, then the region may not be assigned a top-aligned electronically editable form field and may instead use a bottom-aligned electronically editable form field.

Additional measurements of the region can be made to ensure certain sizing criteria is satisfied. For example, the region's width can be resized to fall within a threshold range. In some implementations, a region width is required to be greater than a minimum threshold size. In some implementations, a region width that is larger than a maximum threshold size for a document is adjusted to a default width. Resizing, or bounding, of a region width is described in more detail in reference to FIG. 26.

If the region was determined to be a form field, the process 3100 can continue by digitizing the form field (3112). The form field identified in the region can be digitized by placing an electronically editable form field, e.g., a text box, at a location defined by the user selected position, as described in reference to FIG. 27. In some implementations, an electronically editable form field is positioned at the user selected position, as described in reference to FIG. 28. The electronically editable form field can be sized according to the form field using measurements that were made during the form field detection process as described in 3110. An electronically editable form field for a region can also be snapped in a position relative to a user selected position, as described in reference to FIG. 28.

Otherwise, if a form field was not found, the process 3100 can, optionally, continue by creating a default electronically editable form field at the position (3114). For example, if no form field was found, a default-sized electronically editable form field can be positioned at the user selected position.

Exemplary Operating Environment

Figure 32:
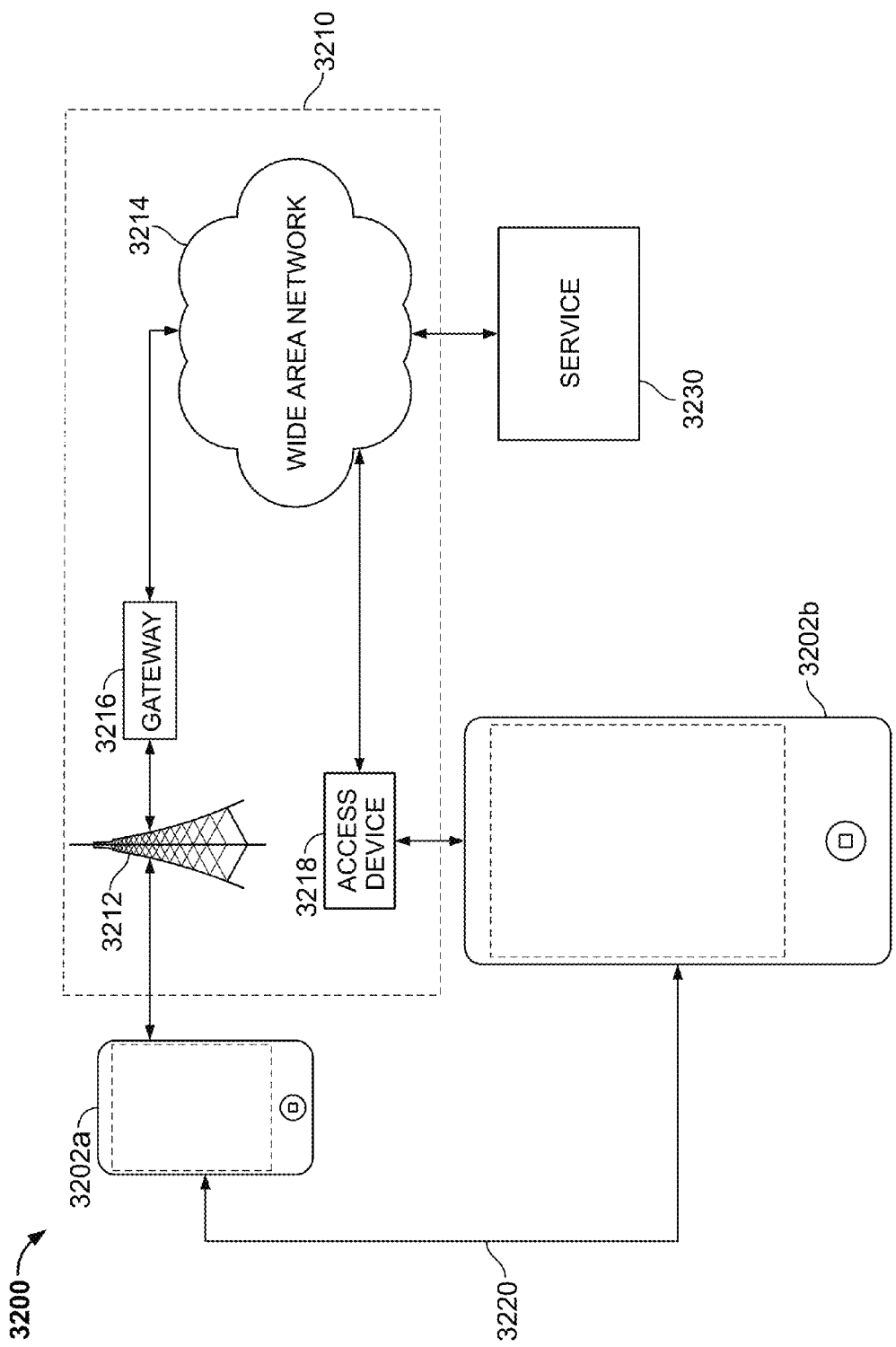
FIG. 32 is a block diagram of an exemplary operating environment for a device capable of running a document assembly and automated contextual form field generation application.

FIG. 32 is a block diagram of an exemplary operating environment for a device capable of running a document assembly and automated contextual form generation application. In some implementations, devices 3202a and 3202b can communicate over one or more wired or wireless networks 3210. For example, wireless network 3212 (e.g., a cellular network) can communicate with a wide area network (WAN) 3214 (e.g., the Internet) by use of gateway 3216. Likewise, access device 3218 (e.g., IEEE 802.11g wireless access device) can provide communication access to WAN 1114. Devices 3202a, 3202b can be any device capable of displaying GUIs of the disclosed document assembly and automated contextual form generation application, including but not limited to portable computers, smart phones and electronic tablets. In some implementations, the devices 3202a, 3202b do not have to be portable but can be a desktop computer, television system, kiosk system or the like.

In some implementations, both voice and data communications can be established over wireless network 3212 and access device 3218. For example, device 3202a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 3212, gateway 3216, and WAN 3214 (e.g., using Transmission Control Protocol/Internet Protocol (TCP/IP) or User Datagram Protocol (UDP)). Likewise, in some implementations, device 3202*b* can place and receive phone calls, send and receive e-mail messages, and retrieve electronic documents over access device 3218 and WAN 3214. In some implementations, device 3202*a* or 3202*b* can be physically connected to access device 3218 using one or more cables and access device 3218 can be a personal computer. In this configuration, device 3202*a* or 3202*b* can be referred to as a "tethered" device.

Devices 3202*a* and 3202*b* can also establish communications by other means. For example, wireless device 3202*a* can communicate with other wireless devices (e.g., other devices 3202*a* or 3202*b*, cell phones) over the wireless network 3212. Likewise, devices 3202*a* and 3202*b* can establish peer-to-peer communications 3220 (e.g., a personal area network) by use of one or more communication subsystems, such as the Bluetooth™ communication devices. Other communication protocols and topologies can also be implemented.

Devices 3202*a* or 3202*b* can communicate with service 3230 over the one or more wired and/or wireless networks 3210. For example, service 3230 can be an online document assembly and automated contextual form generation service that includes the features described in reference to FIGS. 1-29.

Device 3202*a* or 3202*b* can also access other data and content over one or more wired and/or wireless networks 3210. For example, content publishers, such as news sites, Really Simple Syndication (RSS) feeds, Web sites and developer networks can be accessed by device 3202*a* or 3202*b*. Such access can be provided by invocation of a web browsing function or application (e.g., a browser) running on the device 3202*a* or 3202*b*.

Devices 3202*a* and 3202*b* can exchange files over one or more wireless or wired networks 3210 either directly or through service 3230.

Exemplary Device Architecture

Figure 33:
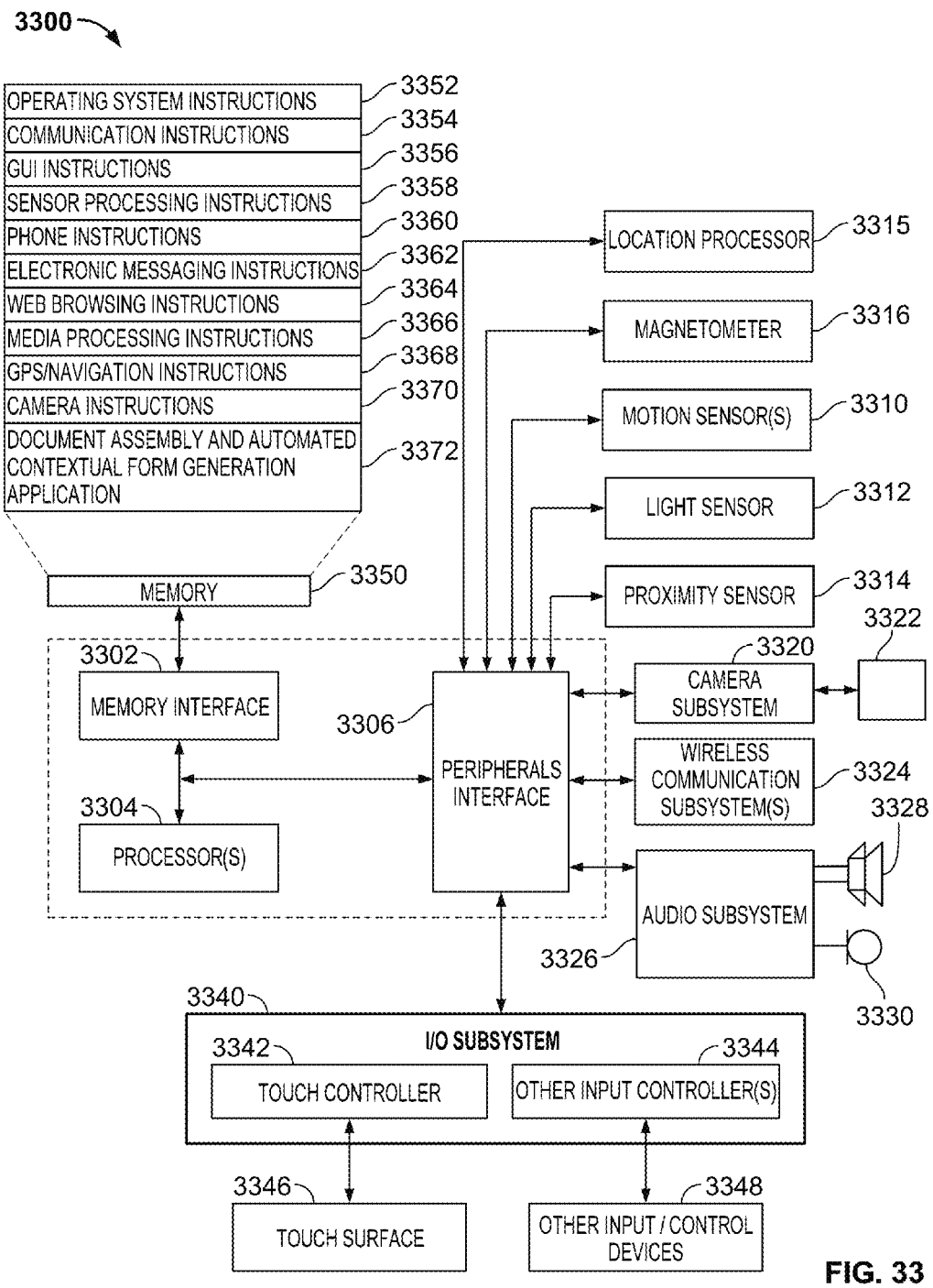
FIG. 33 is a block diagram of an exemplary architecture for a device capable of running a document assembly and automated contextual form field generation application.

FIG. 33 is a block diagram of an exemplary architecture for a device capable of running the disclosed document assembly and automated contextual form generation application. Architecture 3300 can be implemented in any device for generating the features described in reference to FIGS. 1-29, including but not limited to portable or desktop computers, smart phones and electronic tablets, television systems, game consoles, kiosks and the like. Architecture 3300 can include memory interface 3302, data processor(s), image processor(s) or central processing unit(s) 3304, and peripherals interface 3306. Memory interface 3302, processor(s) 3304 or peripherals interface 3306 can be separate components or can be integrated in one or more integrated circuits. The various components can be coupled by one or more communication buses or signal lines.

Sensors, devices, and subsystems can be coupled to peripherals interface 3306 to facilitate multiple functionalities. For example, motion sensor 3310, light sensor 3312, and proximity sensor 3314 can be coupled to peripherals interface 3306 to facilitate orientation, lighting, and proximity functions of the device. For example, in some implementations, light sensor 3312 can be utilized to facilitate adjusting the brightness of touch surface 3346. In some implementations, motion sensor 3310 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 3306, such as a temperature sensor, a biometric sensor, or other sensing device, to facilitate related functionalities.

Location processor 3315 (e.g., GPS receiver) can be connected to peripherals interface 3306 to provide geo-positioning. Electronic magnetometer 3316 (e.g., an integrated circuit chip) can also be connected to peripherals interface 3306 to provide data that can be used to determine the direction of magnetic North. Thus, electronic magnetometer 3316 can be used as an electronic compass.

Camera subsystem 3320 and an optical sensor 3322, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 3324. Communication subsystem(s) 3324 can include one or more wireless communication subsystems. Wireless communication subsystems 3324 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 3324 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 3324 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 3326 can be coupled to a speaker 3328 and one or more microphones 3330 to facilitate voice-enabled functions, such as voice recognition, voice replication, digital recording, and telephony functions.

I/O subsystem 3340 can include touch controller 3342 and/or other input controller(s) 3344. Touch controller 3342 can be coupled to a touch surface 3346. Touch surface 3346 and touch controller 3342 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 3346. In one implementation, touch surface 3346 can display virtual or soft buttons and a virtual keyboard, which can be used as an input/output device by the user.

Other input controller(s) 3344 can be coupled to other input/control devices 3348, such as one or more buttons, rocker switches, thumb-wheel, infrared port, USB port, and/ or a pointer device such as a stylus. The one or more buttons (not shown) can include an up/down button for volume control of speaker 3328 and/or microphone 1230.

In some implementations, device 3300 can present recorded audio and/or video files, such as MP3, AAC, and MPEG files. In some implementations, device 3300 can include the functionality of an MP3 player and may include a pin connector for tethering to other devices. Other input/output and control devices can be used.

Memory interface 3302 can be coupled to memory 3350. Memory 3350 can include high-speed random access memory or non-volatile memory, such as one or more magnetic disk storage devices, one or more optical storage devices, or flash memory (e.g., NAND, NOR). Memory 3350 can store operating system 3352, such as Darwin, RTXC, LINUX, UNIX, OS X, WINDOWS, or an embedded operating system such as VxWorks. Operating system 3352 may include instructions for handling basic system services and for performing hardware dependent tasks. In some implementations, operating system 3352 can include a kernel (e.g., UNIX kernel).

Memory 3350 may also store communication instructions 3354 to facilitate communicating with one or more additional devices, one or more computers or servers. Communication instructions 3354 can also be used to select an operational mode or communication medium for use by the device, based on a geographic location (obtained by the GPS/Navigation instructions 3368) of the device. Memory 3350 may include graphical user interface instructions 3356 to facilitate graphic user interface processing, such as generating the GUIs shown in FIGS. 1-10; sensor processing instructions 3358 to facilitate sensor-related processing and functions; phone instructions 3360 to facilitate phone-related processes and functions; electronic messaging instructions 3362 to facilitate electronic-messaging related processes and functions; web browsing instructions 3364 to facilitate web browsing-related processes and functions and display GUIs described in reference to FIGS. 1-29; media processing instructions 3366 to facilitate media processing-related processes and functions; GPS/Navigation instructions 3368 to facilitate GPS and navigation-related processes; camera instructions 3370 to facilitate camera-related processes and functions; and instructions 3372 for a document assembly and automated contextual form generation application that is capable of assembling documents and generating automated contextual forms, as described in reference to FIGS. 1-32. The memory 3350 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 3350 can include additional instructions or fewer instructions. Furthermore, various functions of the mobile device may be implemented in hardware and/or in software, including in one or more signal processing and/or application specific integrated circuits.

What is claimed is:

1. A method comprising:
   displaying one or more pages of a first document in a first region on a user interface;
   displaying thumbnail images of the one or more pages of the first document in a second region on the user interface;
   receiving user input for inserting one or more pages from a non-digitized second document into the first document;
   in response to the user input, determining one or more document settings associated with the first document; and
   digitizing the one or more pages of the non-digitized second document using a document scanning device based in part on the one or more document settings associated with the first document, and inserting the one or more pages of the digitized second document into the first document, wherein the inserted pages are displayed as part of the first document on the user interface.

2. The method of claim 1, wherein the one or more document settings include one or more of a scan resolution, scan area size, color depth, desired post-processing.

3. The method of claim 1, wherein receiving user input for inserting one or more pages from a non-digitized second document into a first document further comprises specifying an insertion position in the first document, wherein the one or more pages of the digitized second document are inserted at the specified insertion position in the first document.

4. The method of claim 3, wherein the insertion position in the first document is specified by adding a placeholder among the thumbnail images of the one or more pages of the first document in the second region on the user interface.

5. The method of claim 1, wherein the inserted pages are displayed as part of the first document in the first region on the user interface, and wherein thumbnail images of the inserted pages are displayed as part of the first document in the second region on the user interface.

6. The method of claim 1, wherein digitizing the second document using a document scanning device further comprises:
   displaying the one or more pages of the digitized second document in the first region on the user interface; and
   receiving a second user input for adjusting the one or more pages of the digitized second document; and
   in response to the second user input, adjusting the one or more pages of the digitized second document.

7. The method of claim 6, wherein adjusting the one or more pages of the digitized second document comprises re-digitizing the one or more pages of the digitized second document.

8. The method of claim 1, wherein the first document is in a portable document format.

9. A system comprising:
   one or more processors; and
   memory coupled to the one or more processors and configured for storing instructions, which, when executed by the one or more processors, cause the one or more processors to perform operations comprising:
      displaying one or more pages of a first document in a first region on a user interface;
      displaying thumbnail images of the one or more pages of the first document in a second region on the user interface;
      receiving user input for inserting one or more pages from a non-digitized second document into the first document;
      in response to the user input, determining one or more document settings associated with the first document; and
      digitizing the one or more pages of the non-digitized second document using a document scanning device based in part on the one or more document settings associated with the first document, and inserting the one or more pages of the digitized second document into the first document, wherein the inserted pages are displayed as part of the first document on the user interface.

10. The system of claim 9, wherein the one or more document settings include one or more of a scan resolution, scan area size, color depth, desired post-processing.

11. The system of claim 9, wherein the instructions that cause the one or more processors to perform operations comprising receiving user input for inserting one or more pages from a non-digitized second document into a first document further comprise instructions that cause the one or more processors to perform operations comprising:
specifying an insertion position in the first document, wherein the one or more pages of the digitized second document are inserted at the specified insertion position in the first document.

12. The system of claim 11, wherein the insertion position in the first document is specified by adding a placeholder among the thumbnail images of the one or more pages of the first document in the second region on the user interface.

13. The system of claim 9, wherein the inserted pages are displayed as part of the first document in the first region on the user interface; and wherein thumbnail images of the inserted pages are displayed as part of the first document in the second region on the user interface.

14. The system of claim 9, wherein the instructions that cause the one or more processors to perform operations comprising digitizing the second document using a document scanning device further comprise instructions that cause the one or more processors to perform operations comprising:
displaying the one or more pages of the digitized second document in the first region on the user interface; and
receiving a second user input for adjusting the one or more pages of the digitized second document; and
in response to the second user input, adjusting the one or more pages of the digitized second document.

15. The system of claim 14, wherein the instructions that cause the one or more processors to perform operations comprising adjusting the one or more pages of the digitized second document comprise instructions that cause the one or more processors to perform operations comprising:
re-digitizing the one or more pages of the digitized second document.

16. The system of claim 9, wherein the first document is in a portable document format.

17. A method comprising:
displaying one or more pages of a first document in a first region on a user interface;
displaying thumbnail images of the one or more pages of the first document in a second region on the user interface;
receiving user input for inserting one or more pages from a non-digitized second document into the first document;
in response to the user input, determining one or more document settings associated with the second document; and
digitizing the one or more pages of the non-digitized second document using a document scanning device based in part on the one or more document settings associated with the second document, and inserting the one or more pages of the digitized second document into the first document, wherein the inserted pages are displayed as part of the first document on the user interface.

18. The method of claim 17, wherein the one or more document settings include one or more of page formatting, size, scan resolution, scan area size, color depth, or desired post-processing.

19. The method of claim 17, wherein receiving user input for inserting one or more pages from a non-digitized second document into a first document further comprises specifying an insertion position in the first document, wherein the one or more pages of the digitized second document are inserted at the specified insertion position in the first document.

20. The method of claim 19, wherein the insertion position in the first document is specified by adding a placeholder among the thumbnail images of the one or more pages of the first document in the second region on the user interface.

21. The method of claim 17, wherein the inserted pages are displayed as part of the first document in the first region on the user interface, and wherein thumbnail images of the inserted pages are displayed as part of the first document in the second region on the user interface.

22. The method of claim 17, wherein digitizing the second document using a document scanning device further comprises:
displaying the one or more pages of the digitized second document in the first region on the user interface; and
receiving a second user input for adjusting the one or more pages of the digitized second document; and
in response to the second user input, adjusting the one or more pages of the digitized second document.

23. The method of claim 22, wherein adjusting the one or more pages of the digitized second document comprises re-digitizing the one or more pages of the digitized second document.

24. The method of claim 17, wherein determining one or more document settings associated with the second document comprises:
determining one or more document settings associated with the second document based on a first digitized page of the second document.

25. A system comprising:
one or more processors; and
memory coupled to the one or more processors and configured for storing instructions, which, when executed by the one or more processors, cause the one or more processors to perform operations comprising:
displaying one or more pages of a first document in a first region on a user interface;
displaying thumbnail images of the one or more pages of the first document in a second region on the user interface;
receiving user input for inserting one or more pages from a non-digitized second document into the first document;
in response to the user input, determining one or more document settings associated with the second document; and
digitizing the one or more pages of the non-digitized second document using a document scanning device based in part on the one or more document settings associated with the second document, and inserting the one or more pages of the digitized second document into the first document, wherein the inserted pages are displayed as part of the first document on the user interface.

26. The system of claim 25, wherein the one or more document settings include one or more of page formatting, size, scan resolution, scan area size, color depth, or desired post-processing.

27. The system of claim 25, wherein receiving user input for inserting one or more pages from a non-digitized second document into a first document further comprises specifying an insertion position in the first document, wherein the one or more pages of the digitized second document are inserted at the specified insertion position in the first document.

28. The system of claim 27, wherein the insertion position in the first document is specified by adding a placeholder among the thumbnail images of the one or more pages of the first document in the second region on the user interface.

29. The system of claim 25, wherein the inserted pages are displayed as part of the first document in the first region on the user interface, and wherein thumbnail images of the inserted pages are displayed as part of the first document in the second region on the user interface.

30. The system of claim 25, wherein digitizing the second document using a document scanning device further comprises:
  displaying the one or more pages of the digitized second document in the first region on the user interface; and
  receiving a second user input for adjusting the one or more pages of the digitized second document; and
  in response to the second user input, adjusting the one or more pages of the digitized second document.

31. The system of claim 30, wherein adjusting the one or more pages of the digitized second document comprises re-digitizing the one or more pages of the digitized second document.

32. The system of claim 25, wherein determining one or more document settings associated with the second document comprises:
  determining one or more document settings associated with the second document based on a first digitized page of the second document.

* * * * *